US008468442B2

(12) United States Patent
Chopin et al.

(10) Patent No.: US 8,468,442 B2
(45) Date of Patent: Jun. 18, 2013

(54) SYSTEM AND METHOD FOR RENDERING DATA

(75) Inventors: Stefan Chopin, Weston, CT (US); Robert Krugman, Dix Hills, NY (US); Marc Strausberg, Pound Ridge, NY (US); Leslie Barrett, New York, NY (US)

(73) Assignee: RR Donnelley Financial, Inc., Chicago, IL (US)

( * ) Notice: Subject to any disclaimer, the term of this patent is extended or adjusted under 35 U.S.C. 154(b) by 0 days.

(21) Appl. No.: 13/022,874

(22) Filed: Feb. 8, 2011

(65) Prior Publication Data

US 2011/0231748 A1 Sep. 22, 2011

Related U.S. Application Data

(63) Continuation of application No. 11/788,558, filed on Apr. 20, 2007, now Pat. No. 7,917,841, which is a continuation-in-part of application No. 11/397,105, filed on Apr. 4, 2006, now Pat. No. 7,877,678, which is a continuation-in-part of application No. 11/214,083, filed on Aug. 29, 2005, now abandoned.

(51) Int. Cl.
*G06F 17/00* (2006.01)

(52) U.S. Cl.
USPC ........... 715/209; 715/200; 715/213; 715/212; 715/210

(58) Field of Classification Search
USPC ................. 715/212, 213, 200, 239, 210, 209
See application file for complete search history.

(56) References Cited

U.S. PATENT DOCUMENTS

| | | | | |
|---|---|---|---|---|
| 5,179,650 A | * | 1/1993 | Fukui et al. | 715/209 |
| 5,761,666 A | * | 6/1998 | Sakai et al. | 1/1 |
| 5,873,056 A | * | 2/1999 | Liddy et al. | 704/9 |
| 5,893,131 A | | 4/1999 | Kornfeld | |
| 6,502,081 B1 | * | 12/2002 | Wiltshire et al. | 706/12 |
| 6,675,159 B1 | * | 1/2004 | Lin et al. | 1/1 |
| 6,751,600 B1 | * | 6/2004 | Wolin | 706/12 |
| 6,779,151 B2 | | 8/2004 | Cahill et al. | |
| 6,886,010 B2 | * | 4/2005 | Kostoff | 1/1 |
| 7,050,992 B1 | * | 5/2006 | Bowman et al. | 705/26.3 |
| 7,162,465 B2 | * | 1/2007 | Jenssen et al. | 1/1 |
| 7,321,880 B2 | | 1/2008 | Gosby | |
| 7,415,482 B2 | * | 8/2008 | Blake et al. | 1/1 |
| 2002/0107992 A1 | | 8/2002 | Osbourne et al. | |
| 2002/0156813 A1 | * | 10/2002 | Gardner | 707/513 |
| 2003/0037038 A1 | | 2/2003 | Block et al. | |

(Continued)

*Primary Examiner* — Cesar Paula
*Assistant Examiner* — David Faber
(74) *Attorney, Agent, or Firm* — Wolf, Greenfield & Sacks, P.C.

(57) ABSTRACT

A method of viewing information associated with data in a spreadsheet, includes providing a document including data and information associated with the data, parsing the document to retrieve the associated information, processing the associated information to break the associated information down into at least one sentence, categorizing the at least one sentence to determine whether the at least one sentence corresponds to at least one category in a taxonomy corresponding to the data, assigning an association strength to the categorized at least one sentence, the association strength indicating a likelihood that the categorized at least one sentence actually corresponds to the at least one category in the taxonomy, filtering the at least one categorized sentence based on the association strength to determine whether to match the categorized at least one sentence with the at least one category in the taxonomy and outputting only the categorized at least one sentence matched with the at least one category in the taxonomy.

20 Claims, 36 Drawing Sheets

U.S. PATENT DOCUMENTS

| | | |
|---|---|---|
| 2003/0041077 A1 | 2/2003 | Davis et al. |
| 2004/0039619 A1 | 2/2004 | Zarb |
| 2004/0172592 A1 | 9/2004 | Collie et al. |
| 2004/0225583 A1 | 11/2004 | Joodi |
| 2005/0144096 A1 | 6/2005 | Caramanna, II et al. |
| 2005/0187969 A1 | 8/2005 | Chaudri |
| 2005/0197931 A1* | 9/2005 | Gupta ............................ 705/30 |
| 2006/0184539 A1 | 8/2006 | Blake et al. |
| 2006/0230025 A1 | 10/2006 | Baelen |
| 2006/0242624 A1 | 10/2006 | Mueller-Klingspor |
| 2007/0022373 A1* | 1/2007 | Chidlovskii et al. .......... 715/513 |
| 2007/0078877 A1 | 4/2007 | Ungar et al. |
| 2007/0219986 A1* | 9/2007 | Egozi ................................ 707/5 |
| 2008/0147601 A1 | 6/2008 | Chapus et al. |
| 2010/0311020 A1* | 12/2010 | Shen et al. .................... 434/157 |

\* cited by examiner

| Field | Example Value(s) | Description |
|---|---|---|
| ExchangeCode | N, O, OS, OB, A, MF, PK | N = NYSE<br>O = Nasdaq National Mkt<br>OS = Nasdaq Smallcap Mkt<br>OB = OTC Bulletin Board - An electronic quotation system for unlisted, non-Nasdaq, over-the-counter securities.<br>A = American Stock Exchange LLC<br>MF = Mutual Fund<br>PK = Pink sheets |
| SecurityCode | STOCK | Type of security for the current quote data. |
| LastTrade | 12.45 | Last price (usually delayed by 20 minutes) |
| Change | -0.05 | The difference between the current value and the previous day's close value. |
| PercentChange | -0.706 | Percent difference between the current value and the previous day's close value. |
| Tick | Up, Down, No Change | Indicator of activity based on comparing the last trade to the trade before it. |
| DateTime | 6/23/2005 10:05:00 AM | Date or Time of last trade. If no trades have been recorded for the current day, then the date of the previous trade will shown. |
| Time | 11:02 | Time of last recoded trade or transaction. |
| Ask | | Current price at which the issue is offered for sale. |
| Bid | | Current bid price for the issue. |
| High | | Highest trading price for the current day. |
| Low | | Lowest trading price for the current day. |
| Open | | Price or value of the issue at the start of the current trading day. |
| Volume | | Current volume of the issue for the current trading day. |
| AnnHigh | | Highest recorded selling price during the last 365 days. |
| AnnLow | | Lowest recorded selling price during the last 365 days. |
| Dividend | 1.68 | Annualized dividend disbursements. |
| EPS | 3.88 | Earnings Per Share. This is computed by taking the net earnings for four quarters and dividing that value by the shares outstanding. |
| Close | | Last trading day's closing issue price |
| PE | 12.39 | Price Earnings Ratio. Computed by taking market price and divided earnings per share. |
| Yield | 2.17 | For stock and indexes: Dividend return as a percentage. Calculated dividend divided by latest price. |
| Delay | 20 | Delay time for the current quotes in minutes. |
| Halt | | Indicator for trading halt. |
| Beta | | Indicator of how a stock's weekly change compares to the weekly change of the S&P 500. |
| TSO | 769570000 | Total Shares Outstanding. |
| MarketCap | 59510848100 | Indicator of the current issues of Market Capitalization. |

Figure 13A

|  | Report Date: |
|---|---|
| Company | MSFT |
| Fiscal Year | 2004 |
| Context | Annual |
| Period Start Date - End Date | Jul 01, 2003 - Jun 30, 2004 |
| Source Filing (Filed Date) | 10-K (Aug 26, 2005) |
| Report Type | Audited |
| | |
| Statement of Financial Position | |
| *Statement of Financial Position* | |
| *Assets* | |
| *Assets - Current* | |
| *Cash, Cash Equivalents and Short-Term Investments* | |
| *Cash and Cash Equivalents* | |
| Cash and Cash Equivalents - Total | $14,304,000,000 |
| Short-Term Investments | $46,288,000,000 |
| Cash, Cash Equivalents and Short-Term Investments - Total | $60,592,000,000 |
| *Receivables, Net* | |

- Cut
- Copy
- Paste
- Paste Special...
- Insert...
- Delete...
- Clear Contents
- Insert Comment
- Format Cells...
- Pick From Drop-down List...
- Add Watch
- Create List...
- Hyperlink...
- Look Up...
- Go to source document...
- View XBRL properties...

Figure 13B

| Home | Filings | Profile | Financials | Ownership | Global | IPO's | Transcripts |

Letters | People Search | My Searches and Alerts | My Folders         SEARCH  MSFT  Filings  v [Go] [E
[ Save Filing ] [ Print Filing ] [ Back to Previous Screen ] [ File ]
[E MICROSOFT CORP (MSFT)  Form: 10-K  Filing Date: 8/26/2005
    Filing Agent: RR DONNELLEY (FA)                    Format: [Sections v]

View All Sections |

BALANCE SHEETS

```
(In millions)

June 30                                            2004           2005

Assets
Current assets:
   Cash and equivalents                         $ 14,304       $  4,851
   Short-term investments                         46,288         32,900
                                                --------       --------
   Total cash and short-term investments          60,592         37,751
   Accounts receivable, net                        5,890          7,180
   Inventories                                       421            491
   Deferred income taxes                           2,097          1,701
   Other                                           1,566          1,614
                                                --------       --------
```

FIGURE 14

| | MSFT 2005 | DELL 2006 | IBM 2005 |
|---|---|---|---|
| Symbol | | | |
| Fiscal Year | | | |
| Context | | | |
| Period Start Date - End Date | Annual 7/1/2004 - 6/30/2005 | Annual 1/29/2005 - 2/3/2006 | Annual 1/1/2005 - 12/31/2005 |
| Source Filing (Filed Date) | 10-K (8/26/2005) | 10-K (3/15/2006) | 10-K (2/28/2006) |
| Report Type | Original Period, Audited | Original Period, Audited | Original Period, Audited |
| Statement of Financial Position | | | |
| *Assets* | | | |
| *Assets - Current* | | | |
| *Cash, Cash Equivalents and Short-Term Investments* | | | |
| Cash and Cash Equivalents | | | |
| Cash and Cash Equivalents - Total | $4,851,000,000 | $7,042,000,000 | $12,568,000,000 |
| Short-Term Investments | $32,900,000,000 | $2,016,000,000 | |
| Cash, Cash Equivalents and Short-Term Investments - Total | $37,751,000,000 | $9,059,000,000 | $12,568,000,000 |
| *Marketable Securities* | | | |
| Marketable Securities - Current - Total | | | $1,118,000,000 |
| *Receivables, Net* | | | |
| Accounts and Notes Receivable, Net | | | |
| Accounts Receivable Trade, Net | | | |
| Accounts Receivable Trade, Net - Total | $7,180,000,000 | $4,089,000,000 | $9,540,000,000 |
| Accounts and Notes Receivable, Net - Total | $7,180,000,000 | $4,089,000,000 | $13,750,000,000 |
| Finance Receivable, Net | | $1,363,000,000 | $1,138,000,000 |
| Other Receivables, Net | | | |
| Receivables, Net - Total | $7,180,000,000 | $5,452,000,000 | $24,426,000,000 |
| *Inventories, Net* | | | |
| Inventories, Net | $491,000,000 | $576,000,000 | $2,841,000,000 |
| Deferred Income Taxes - Current | $1,701,000,000 | | $1,765,000,000 |
| *Prepaid Expenses - Current* | | | |
| Prepaid Expenses - Total | | | $2,941,000,000 |
| Other Assets - Current | $1,614,000,000 | $2,620,000,000 | |
| Assets - Current - Total | $48,737,000,000 | $17,706,000,000 | $45,661,000,000 |
| *Assets - Noncurrent* | | | |
| *Property, Plant and Equipment, Net* | | | |
| Property, Plant and Equipment, Gross | | | |
| Property, Plant and Equipment, Gross - Total | | | $34,261,000,000 |
| Property, Plant and Equipment, Net | $2,346,000,000 | $2,005,000,000 | $13,756,000,000 |
| Accumulated Depreciation PPE | | | $20,505,000,000 |
| *Long-Term Investments* | | | |
| Long-Term Investments - Total | $11,004,000,000 | $2,691,000,000 | $4,974,000,000 |
| *Intangible Assets* | | | |
| Goodwill | $3,309,000,000 | | $9,441,000,000 |
| *Intangible Assets (Excluding Goodwill)* | | | |
| Intangible Assets (Excluding Goodwill) - Total | $499,000,000 | | $1,663,000,000 |

- *Cash Equivalents.* Cash equivalents are considered to be highly liquid investment grade debt investments having an original maturity of 90 days or less. As of September 30, 2005, the Company had $3,518,847 in cash and cash equivalents, of which $3,420,042 was invested in highly liquid AAA-rated tax-exempt money market funds.

-

- *Short Term Investments.* As of September 30, 2005, the Company had $23,992,979 invested in a portfolio of periodic auction reset ("PAR") securities, which have coupons that periodically reset to market interest rates at intervals ranging from 7 to 35 days. These PAR securities are being classified as short term investments and consist of AAA-rated tax-exempt municipal bonds. PAR securities are highly liquid and have minimal interest rate risk.

Figure 16

Assets
  Current Assets
    *Cash and Cash Equivalents*
    *Short Term Investments*
    *Marketable Securities*
    *Receivables*
    *Inventories*
    *Deferred Income Taxes*
    *Prepaid Expenses*
  Non Current Assets
    *Property Plant and Equipment*
    Long Term Investments
      *Non Consolidated Subsidiaries*
      *Investment in Affiliates*
    *Intangible Assets*
    *Goodwill*
Liabilities
  Current
    *Accounts Payable &*
*Accrued Expenses*
    *Deferred Revenue*
    *Current Portion Long Term Debt*
    *Notes and Loans Payable – Current*
    *Capital Lease Obligations – Current*
  Non Current
    *Long Term Debt*
    *Long Term Capital Lease Obligations*
    *Pension Obligations & Other Post-*
*Retirement Obligations*
    *Deferred Tax Liability*
    *Minority Interest*
    *Commitments and Contingencies*

Figure 20

| | A | B | C | D | E | F | |
|---|---|---|---|---|---|---|---|
| | B12 ▼ | fx =IMetrix("MSFT", "Commercial & Industrial", "usfr-pt:CashCashEquivalents", "A", 2004, 4, "As Reported And Calculated") | | | | | |
| 1 | Company Symbol | ABC | | | | | |
| 2 | Year | 2004 | | | | | |
| 3 | Period | 4-Annual | | | | | |
| 4 | Data Element | As Reported And Calculated | | | | | |
| 5 | Commercial & Industrial | | | | | | |
| 6 | Statement of Financial Position - CI | | | | | | |
| 7 | Statement of Financial Position | | | | | | |
| 8 | Assets | | | | | | |
| 9 | Assets - Current | | | | | | |
| 10 | Cash, Cash Equivalents and Short Term Investments | | | | | | |
| 11 | Cash and Cash Equivalents | | | | | | |
| 12 | Cash and Cash Equivalents | $15,992,000,000 | | | | | |
| 13 | Short Term Investments | $44,610,000,000 | | | | | |
| 14 | Cash, Cash Equivalents and Short Term Investments | $60,592,000,000 | | | | | |
| 15 | Receivables, Net | | | | | | |

| DASHBOARD | TODAY | COMPANY | INDUSTRY | SEARCH | SCREENER | ANALYTICS | | COMPANY SEARCH | |

EDGAR ONLINE INC (EDGR) 10-K filed 3/16/2007

Return to Contents | Print Filing | View Original — Use Sections To Navigate Through The Document Goodwill is not amortized, but is subject to annual *impairment tests. The Company estimates fair value of its reporting unit and co valuation with the respective carrying value for the reporting unit to determine whether any goodwill* impairment exists.

The goodwill is substantially related to the acquisition of Financial Insight Systems, Inc. ("FIS") in October 2000. When measuring fair Company considers past, present and future expectations of performance. The Company completes goodwill impairment tests at least a: December 31 each year. The Company completed the annual test and determined that there was no impairment of goodwill as of Decen (k) ADVERTISING EXPENSES The Company expenses advertising costs as incurred. Advertising expenses were $48, $154 and $333, for the years ended December 3 and 2006, respectively.

(l) INCOME TAXES

SYSTEM AND METHOD FOR RENDERING DATA

REFERENCE TO RELATED APPLICATION

This application is a continuation of U.S. application Ser. No. 11/788,558, filed Apr. 20, 2007, now U.S. Pat. No. 7,917,841, which is a continuation-in-part of U.S. patent application Ser. No. 11/397,105, filed Apr. 4, 2006, now U.S. Pat. No. 7,877,678, which is a continuation-in-part of U.S. patent application Ser. No. 11/214,083 filed Aug. 29, 2005, now abandoned, the entire contents of each of which are herein incorporated by reference.

BACKGROUND

1. Technical Field

The present disclosure relates generally to financial data and, more particularly, to a system and method for rendering data.

2. Description of the Related Art

The Sarbanes-Oxley Act (the Act) is legislation that affects corporate governance, financial disclosure and the practice of public accounting. The Act was signed into law largely in response to numerous corporate accounting scandals. The Act requires executives, boards of directors and auditors to take precise measures to bring about greater corporate accountability and transparency.

In the electronic format, a file containing a financial statement is usually not coded to indicate the type of information represented by each line or column of text. In order to have a computer extract the desired information from the file, the content of the file has to be identified. That is, the various tables in the file have to be recognized and the content within each table has to be parsed and broken down to their constituent parts.

Once the data is recognized and broken down, it can be normalized and manipulated. For example, the normalized data can be placed in a spreadsheet program or a database program, The performance of the company can then be illustrated and analyzed by various mathematical, statistical, or financial models within the functional capabilities of the spreadsheet program. The relationship between various financial statement entries can be compared and hypothetical situations can be generated and tested. Furthermore, industry analysis can be performed as well by gathering and collating data from the financial statements of several companies. Thus, there is great incentive for identifying and parsing the content of a file containing a financial statement.

A spreadsheet is a programming tool specifically adapted to the manipulation of financial data and provides a rich programming and modeling environment using a number of tools and macros that are familiar to most users of financial data. The cells of a spreadsheet can be used to store both data and formulas for manipulating data. And, as spreadsheet functionality is improved, users familiar with the capabilities of their particular spreadsheet program become dependent on those functions. An example of the improved functionality of spreadsheet programs, U.S. Pat. No. 6,779,151 to Cahill et al., incorporated by reference herein for all purposes, provides for a spreadsheet program that will recognize new object data types, i.e., those in addition to the typical spreadsheet data types such as numbers, texts, date. Boolean and error, and store the new object data types in the cells of the spreadsheet. There have also been inventions developed to parse data and render such data in a spreadsheet, such as U.S. Pat. No. 5,893,131 to Kornfeld for a method and apparatus for parsing data, incorporated by reference herein for all purposes, and U.S. application Ser. No. 10/086,522, U.S. publication no. 20030037038 to Block et al. for a method for adding metadata to data, incorporated by reference herein for all purposes.

In the past, in order to obtain the utility provided by a spreadsheet with financial data such as that supplied to the U.S. Securities and Exchange Commission (SEC), a spreadsheet user would "copy and paste" the relevant information from a document from a data provider into the spreadsheet for further use and analysis. Not only was this process cumbersome and time consuming, but it also allows the introduction of data errors into the spreadsheet. In addition, there was no method for reversing the process from the spreadsheet program to the online data provider.

To facilitate the flow of corporate financial information from public companies to analysts, regulators and investors, Extensible Business Reporting Language (XBRL) was developed. XBRL is a meta-data standard or data that describes data. That is, an XBRL tag associated with a number or text describes the meaning of the data. For example, assume that a company announces that it produced $5.7 Mil. in 2003. With no context, it is difficult to determine what the number in this statement relates to. It could mean, for example, the company's revenue, gross margin, executive salaries, etc. However, XBRL can be used to place a tag indicating that the 5.7 Mil. represents revenue for the year 2003.

XBRL is quickly becoming a global standard for the preparation of financial information for facilitating its transfer and ease of usability. XBRL tags financial information so that it can be tracked from interactions with vendors, etc. and so that it can readily be used in reports for operating divisions of a company, consolidated earnings releases, etc. Systems have been developed for converting financial documents into XBRL. For example, Rivet Software has developed a system called "Dragon Tag" that is used for this purpose. There are also other companies that provide XBRL tagged data. For example, Edgar Online provides XBRI-tagged SEC filing data and OneSource provides access to U.K. financial data in XBRL.

One goal of the push to derive such a standard for financial information is to enable an entire new generation of Web services that will make it easier for financial analysts and regulators to locate problems in financial data, executives to compare their company to competitors, and analysts to identify performing stocks.

Documents such as financial documents often include information besides that in the main body of the document. This information is referred to herein as "associated information". This associated information may include, for example, footnotes, head notes, management discussion, etc. Although the associated information may not be included in the main body of the financial document, it may nevertheless contain important information that can be useful when evaluating the financials of a company.

It would be beneficial to enable users to view the associated information along with the information in the main body of a document so that the associated information can be viewed in context.

SUMMARY

This application describes tools (in the form of methodologies, apparatuses, and systems) for viewing information associated with data in a spreadsheet. The tools may be embodied in one or more computer programs stored on a computer readable medium or program storage device and/or transmitted in the form of a computer data signal in one or more segments via a computer network or other transmission medium.

A method of viewing information associated with data in a spreadsheet, includes providing a document including data and information associated with the data, parsing the document to retrieve the associated information, processing the associated information to break the associated information down into at least one sentence, categorizing the at least one sentence to determine whether the at least one sentence corresponds to at least one category in a taxonomy corresponding to the data, assigning an association strength to the categorized at least one sentence, the association strength indicating a likelihood that the categorized at least one sentence actually corresponds to the at least one category in the taxonomy, filtering the at least one categorized sentence based on the association strength to determine whether to match the categorized at least one sentence with the at least one category in the taxonomy and outputting only the categorized at least one sentence matched with the at least one category in the taxonomy.

A system for viewing information associated with data in a spreadsheet, includes a module for providing a document including data and information associated with the data, a module for parsing the document to retrieve the associated information, a module for processing the associated information to break the associated information down into at least one sentence, a module for categorizing the at least one sentence to determine whether the at least one sentence corresponds to at least one category in a taxonomy corresponding to the data, a module for assigning an association strength to the categorized at least one sentence, the association strength indicating a likelihood that the categorized at least one sentence actually corresponds to the at least one category in the taxonomy, a module for filtering the at least one categorized sentence based on the association strength to determine whether to match the categorized at least one sentence with the at least one category in the taxonomy and a module for outputting only the categorized at least one sentence matched with the at least one category in the taxonomy.

A computer recording medium including computer executable code for viewing information associated with data in a spreadsheet. The computer executable code includes code for providing a document including data and information associated with the data, code for parsing the document to retrieve the associated information, code for processing the associated information to break the associated information down into at least one sentence, code for categorizing the at least one sentence to determine whether the at least one sentence corresponds to at least one category in a taxonomy corresponding to the data, code for assigning an association strength to the categorized at least one sentence, the association strength indicating a likelihood that the categorized at least one sentence actually corresponds to the at least one category in the taxonomy, code for filtering the at least one categorized sentence based on the association strength to determine whether to match the categorized at least one sentence with the at least one category in the taxonomy and code for outputting only the categorized at least one sentence matched with the at least one category in the taxonomy.

BRIEF DESCRIPTION OF THE DRAWINGS

A more complete appreciation of the present disclosure and many of the attendant advantages thereof win be readily obtained as the same becomes better understood by reference to the following detailed description when considered in connection with the accompanying drawings, wherein;

FIGS. 4A-4F, 5 and 6 are screen shots for describing aspects of a Fundamental Data Wizard according to embodiments of the present disclosure;

FIGS. 7 and 8A-8D are screen shots for describing aspects of a Market Data Wizard according to embodiments of the present disclosure;

FIGS. 13A and 13 B are screen shots for describing a link back feature according to embodiments of the present disclosure;

FIG. 14 is a screen shot for describing how multiple company financials can be displayed in a spreadsheet at the same time;

FIG. 15 is a view of portion of a footnote section of a financial document;

FIG. 16 is view of a list of categories;

FIG. 20 is a screen shot of information displayed to a user according to an embodiment of the present disclosure.

FIG. 24 is a screen shot of selected related note information displayed in context according to an embodiment of the present disclosure.

DETAILED DESCRIPTION

The following exemplary embodiments are set forth to aid in an understanding of the subject matter of this disclosure, but are not intended, and may not be construed, to limit in any way the claims which follow thereafter. Therefore, while specific terminology is employed for the sake of clarity in describing some exemplary embodiments, the present disclosure is not intended to be limited to the specific terminology so selected, and it is to be understood that each specific element includes all technical equivalents which operate in a similar manner.

Figure 1:
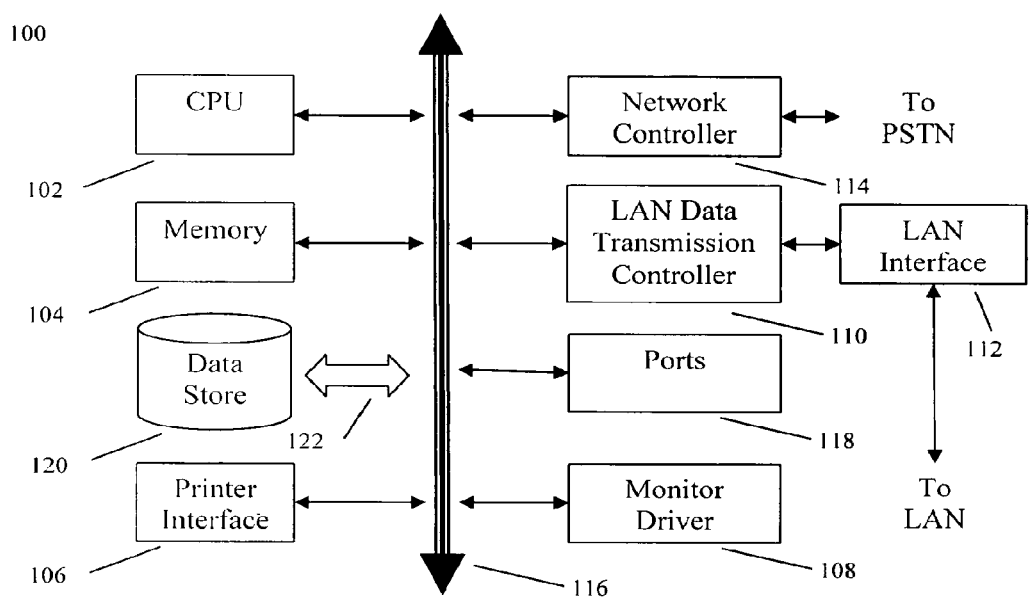
FIG. 1 is a block diagram of an exemplary computer system capable of implementing the method and system of the present disclosure.

FIG. 1 shows an example of a computer system 100 which may implement the method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system, for example, floppy disk, compact disk, hard disk, etc., or may be remote from the computer system and accessible via a hard wired or wireless connection to a network, for example, a local area network, or the Internet.

The computer system 100 can include a central processing unit (CPU) 102, program and data storage devices 104, a printer interface 106, a display unit 108, a (LAN) local area network data transmission controller 110, a LAN interface 112, a network controller 114, an internal bus 116, and one or more input devices 118 (for example, a keyboard, mouse etc.). As shown, the system 100 may be connected to a database 120, via a link 122.

The computer system 100 is merely exemplary. The specific embodiments described herein are illustrative, computer system(s) as referred to herein may include(s) individual computers, servers, computing resources, networks, etc., and many variations can be introduced on these embodiments without departing from the spirit of the disclosure or from the scope of the appended claims.

According to an embodiment of the present disclosure, financial documents in XBRL, are rendered into a spreadsheet, preferably Microsoft® Excel. According to an embodiment of the present disclosure, the present system is delivered through a Dynamic Link Library (DLL) and is registered upon installation as a spreadsheet add-in. Although Microsoft Excel is used herein as an example of a spreadsheet program, other spreadsheet programs may be utilized in its place. In addition, according to another embodiment of the present disclosure, the present system may be compiled as part of the actual spreadsheet program and is not a part of the DLL.

Figure 2A:
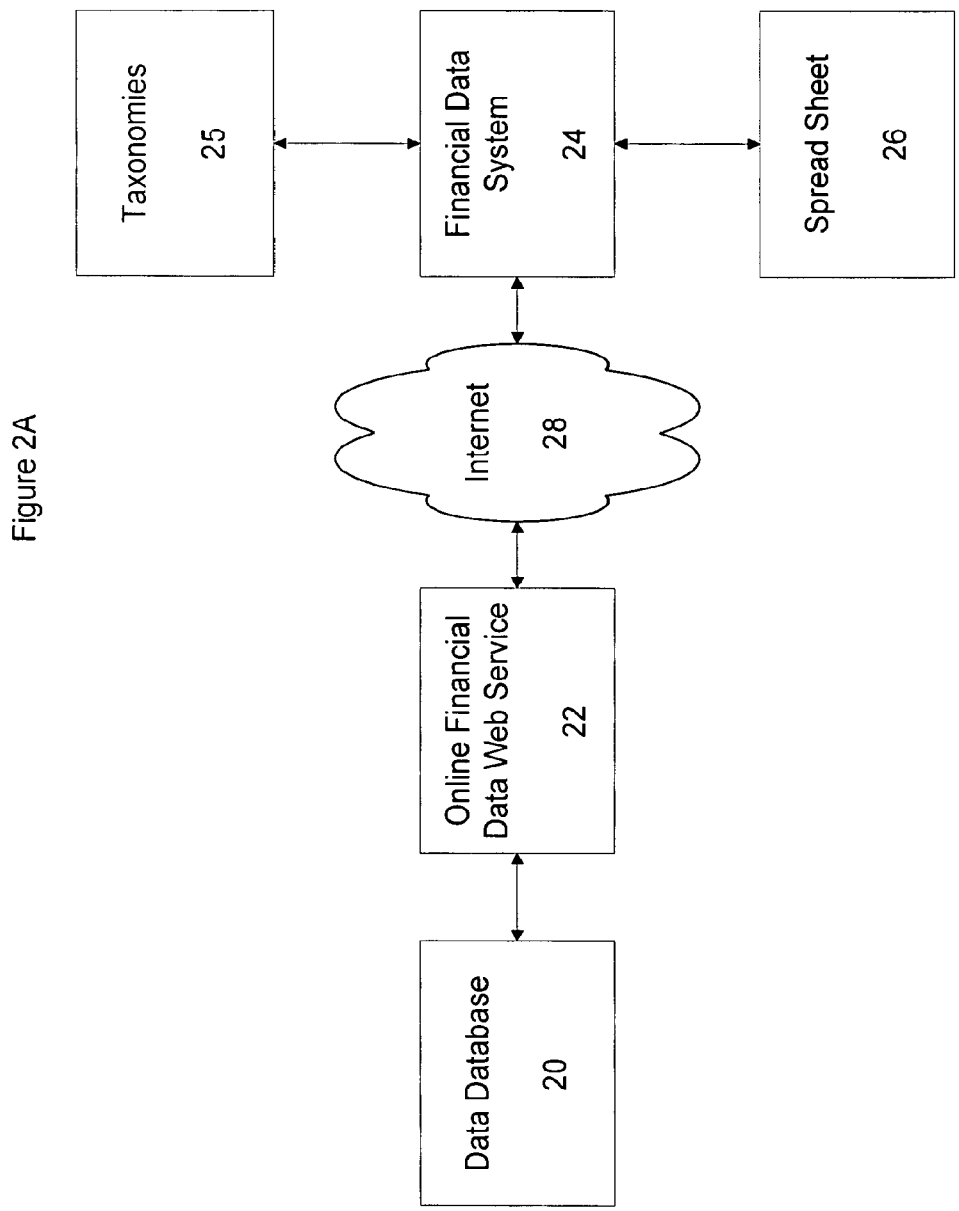
FIG. 2A is a block diagram of an overall architecture used for implementing embodiments of the present disclosure.

An overall architecture of a system for rendering financial documents into a spreadsheet is shown in FIG. 2A According to this embodiment of the present disclosure, the present system is an add-in to the spreadsheet 26. The add-in will be referred to herein as financial data system 24 or simply system 24. Database 20 may consist of one or more databases and/or other types of sources of business and financial information. For example, database 20 may include source financial disclosure documents filed with the Securities and Exchange Commission. Database 20 may also include other types of source documents from which business and financial information can be obtained. An online financial data web service 22 such as, for example, the service offered by Edgar Online, Inc., is accessed by the present system 24 via the Internet 28. In response to a query generated by system 24 for specific financial data, financial data online web service 22 will access the appropriate data from database 20 and return the data to system 24. For example, according to an embodiment of the present disclosure, an XML response including an XBRL instance document is returned to system 24. Utilizing the instance document and taxonomies 25 locally or remotely available to it, system 24 then populates spreadsheet 26 as appropriate. This bi-directional compatibility with standard XML and XBRL, taxonomies allows the direct use of the functional capabilities of the spreadsheet program such as custom macros, existing models and work sheet.

Because not all companies use the same terminology, the taxonomies used by standards organizations also include synonyms and alternative phrases that have the same meaning. For example synonyms for Sales could include "Revenues" or "Fees". Cost of Goods Sold might be "Cost of Goods" or "Cost of Sales". Taxonomies and their extensions are used to define the information Labels. For example in a financial report, the label <Sales> followed by a numerical value indicates that the numerical value, relates to company's Sales <Cost of Goods Sold> followed by a numerical value indicates that the value represents the company's Cost of Goods Sold. Since Gross Profit is Sales minus Cost of Goods Sold, computers could access third party reports that show these values and easily calculate the Gross Profit with a simple rule that says <Sales><minus><Cost of Goods Sold>=<Gross Profit>.

Embodiments of the present disclosure thus provide methods and systems for automating entry of XML and XBRL compliant data into non-XML or non-XBRL compliant programs or applications. In addition to rendering the XML and XBRL compliant data into a spreadsheet compatible format, the present system also provides for transmitting data in a format compliant with the Simple Object Access Protocol (SOAP). Briefly, (SOAP) is a way for a program running in one kind of operating system to communicate with a program in the same or a different kind of operating system by using the Internet's HTTP and XML as the mechanisms for information exchange.

Figure 2B:
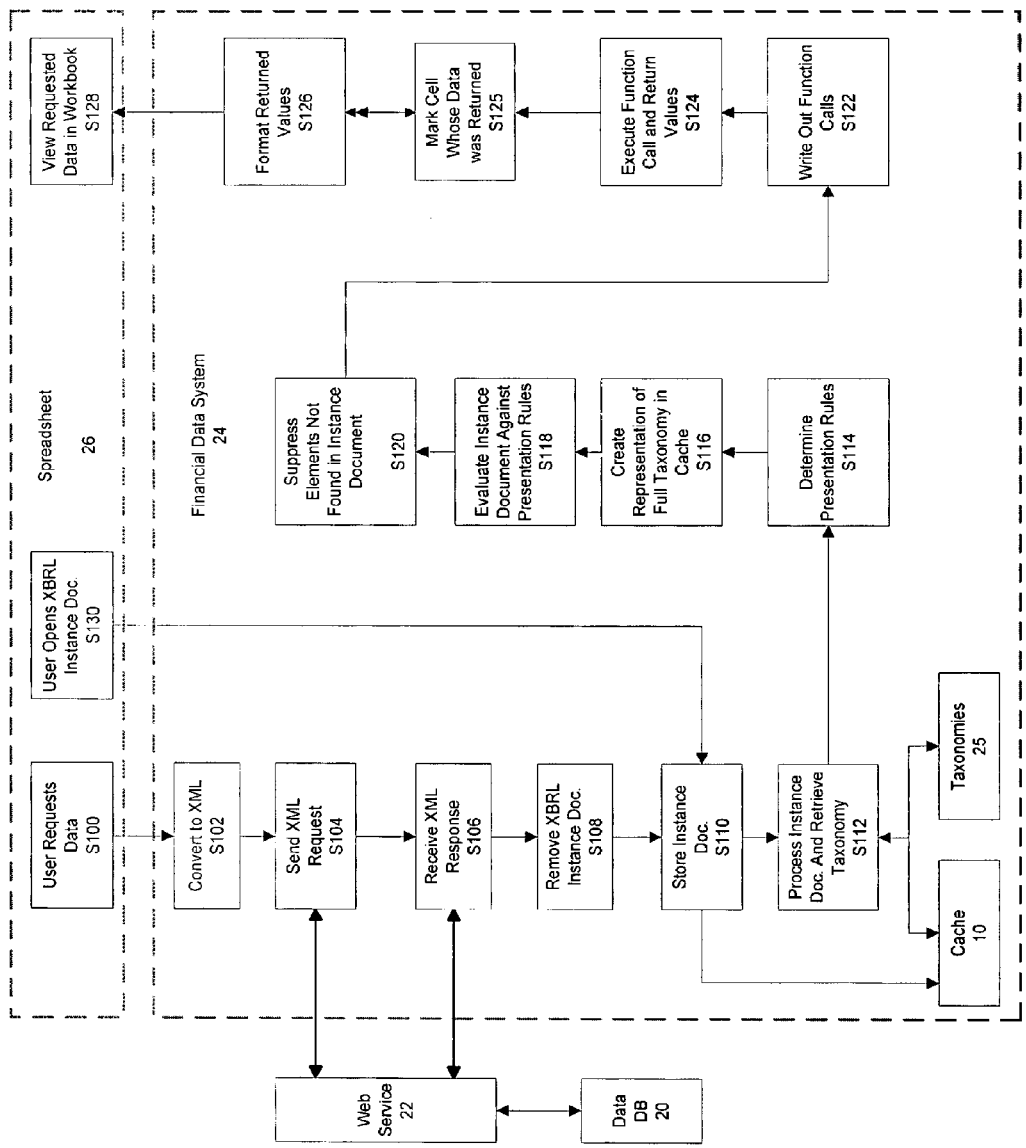
FIG. 2B is a flow chart for describing operation of a financial data system according to embodiments of the present disclosure.

FIG. 2B is a flow chart for describing steps involved in invoking processes according to embodiments of the present disclosure. From the spreadsheet 26, a user may request corporate financial data for one or more companies through an online data provider 22 (Step S100). System 24 converts the user's request to XML format (Step S102). The now-converted XML request is then sent to the online web service 22 (Step S104). According to an embodiment of the present disclosure, online web service 22 is a SOAP-compliant web service linked to Database 20. Web service 22 retrieves the appropriate financial information from database 20 and returns an XML response to system 24. The response includes a XBRL instance document including a dataset. An XBRL instance document is an XML document that contains a list of elements and values. This XBRL instance document is created by the online web service 22 by pulling data for selected companies from the database 20 and creating the XBRL, instance document. Additionally the user may request that data from a XBRL, instance document created outside of the online data provider be leveraged. For example, a user may open an existing XBRL, instance document (Step S130). Regardless of the method used to retrieve the data, the instance document will be stored as a file in the cache 10 (Step S110) so that the user can make use of the instance document offline at a later time if desired. The cache 10 may include one or more storage devices provided on the same computer as system 24 and spreadsheet 26 or remotely accessible by system 24. The instance document is processed and a taxonomy associated with the instance document (or company being examined) is retrieved from cache, local directory or the Internet (Step S112). A taxonomies presentation linkbase, calculation linkbase, or user defined presentation is then processed to determine a set or presentation rules (Step S114). A representation of the full taxonomy is then created in cache 10 (Step S116). The instance document's elements are then retrieved and evaluated against full presentation (Step S118).

Elements not found in the selected instance documents are suppressed (Step S120). That is, when the data in the spreadsheet is represented, the system only displays those tags and labels which are represented in the one or more selected company's financials. For example, if a company does not report short term investments in their quarterly or annual reports, then the system will not present the label in the spreadsheet output because it is not relevant for this company. As will be described in more detail later below, the user of the present system writes out data provider function calls for the elements to be included in the spreadsheet. The system then executes the function calls and returns the values found in the instance document(s) (Step S124). The system also marks each cell where data was returned as a XBRL element (Step S125). This allows a user to linkback to and view the source document (e.g., see FIGS. 13A and 13B) that provided the data in that cell. This also allows a user to view the XBRL Properties of the data in a cell by right-clicking on the cell and selecting "Properties".

Figure 2C:
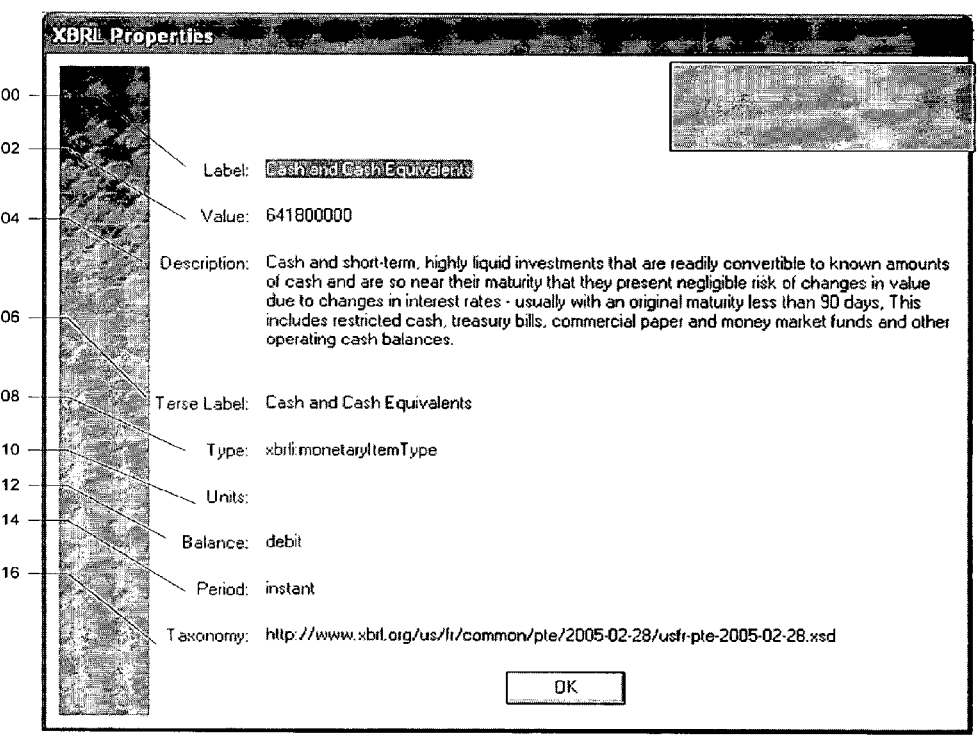
FIG. 2C is a Dialog box of the XBRL Properties of a cell in a spreadsheet selected by a user.

FIG. 2C is an example showing the XBRL Properties dialog box for the data of a selected cell. Label 200 is a label associated with the portion of the document where the data was taken. That is, label 200 is the primary label associated with this element in the label linkbase. Value 202 is the value associated with the element that was taken from the document. Description 204 is a brief description of the element generally providing an accounting text book description of what the data represents. Terse label 206 is a secondary label associated with the element. Type 208 shows the data type associated with the element. Units 210 presents the currency associated with the value and is generally relevant for monetary item types only. Balance 212 enables the user to understand if the element is a credit or a debit. Period 214 explains the duration associated with the data element. "Instant" would mean the data is from the end Date of the period and "Duration" would mean the data is from the beginning of the period to the end of the period. For example, revenue is generated across the whole period so it would be "Duration", while cash would be the cash on hand at the end of the period so it would be an "Instant" element. Taxonomy 216 shows the web address of a taxonomy associated with the document or data taken. The system formats the returned values as defined in the presentation linkbase (Step S126). The user can then view the requested data in the spreadsheet as, for example, a workbook (Step S128).

Various aspects of the present system will now be described. It should be noted that although described as an add-in to a spreadsheet, in the alternative, the present system may itself include a fully functional spreadsheet.

Figure 3:
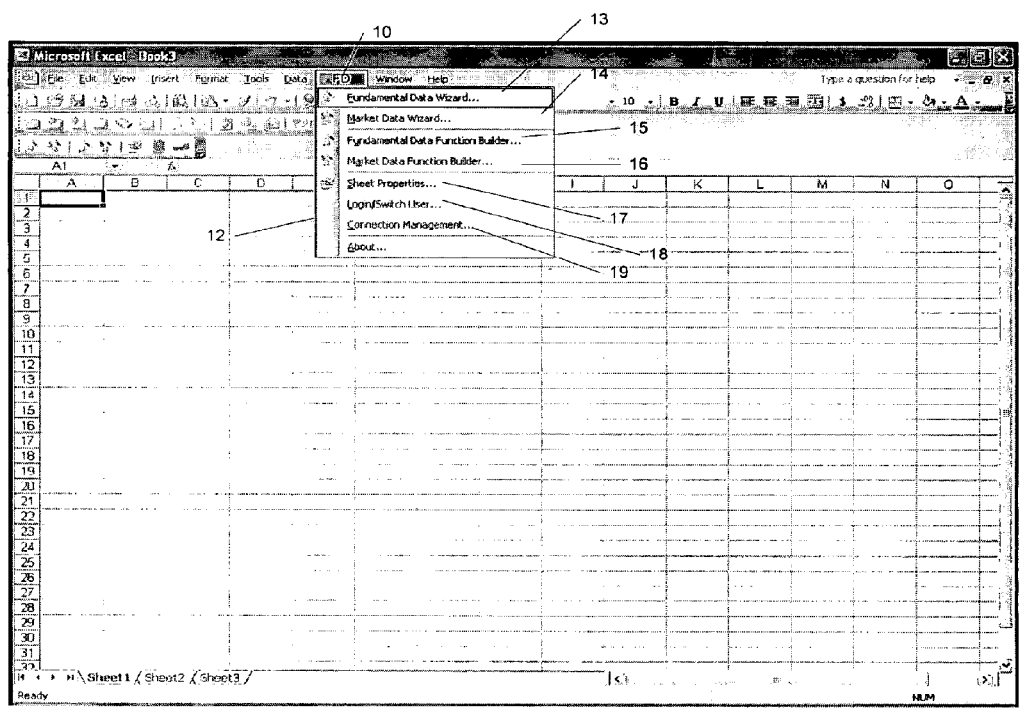
FIG. 3 is a screen shot of a spreadsheet including a main menu according to embodiments of the present disclosure.

FIG. 3 shows a Microsoft Excel spreadsheet window. The spreadsheet includes an add-in for rendering financial data and according to an embodiment of the present disclosure, is presented to the user as a button labeled FD (Financial Data) 10 in the spreadsheet's toolbar. When clicking on this button, the user is presented with a main menu 12 providing the user several options. For example, the user can activate a Fundamental Data Wizard 13 or a Market Data Wizard 14. The Fundamental Data Wizard 13 helps the user to retrieve fundamental data by guiding them through several questions. The user's answers to these questions will be used by the system to determine which data to return. The Market Data Wizard 14 is similar to the Fundamental Data Wizard 13 but is used to retrieve intraday and historical market data. The user is also given the option of using a Fundamental Data Function Builder 15 or a Market Data Function Builder 16. The Data Function Builders assist the user in creating custom analytical tools and models by helping them pull in fundamental data (Fundamental Data Function Builder) or market data (Market Data Function Builder). Sheet Properties 17 allows a user to modify the properties of previously requested data or to select new data. The user is also given an option to select Connection Management 19 which provides tools for logging, modifying data sources and general tool administration. Login/Switch User 18 allows a user to log in or switch to a different user.

Figure 4A:
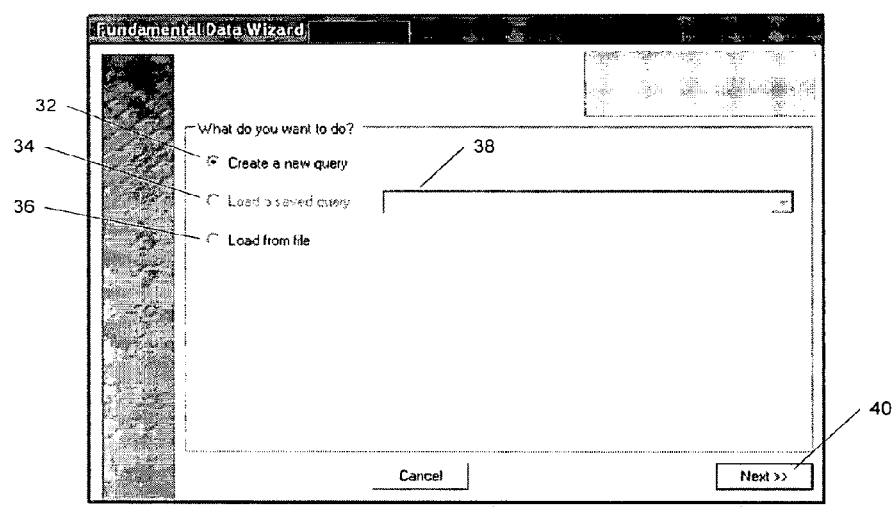

The Fundamental Data Wizard 13 (FDW) allows a user to enter and create a query (or load an existing saved query) used to retrieve data from an online data service such as, for example, EDGAR Online Highlighting and clicking on FDW 13, a screen such as that shown in FIG. 4A is displayed. This window allows a user to create or load a query by selecting one of buttons 32, 34 and 36. Selecting button 34, the user is prompted to input a file name for a file they want to review. Selecting button 36 and inputting a query name in window 38 allows the user to retrieve from storage a previously saved query. Selecting button 32, the user is prompted to create a new query. After the user has made a selection and presses the NEXT button 40, the screen shown in FIG. 4B is displayed.

Figure 4B:
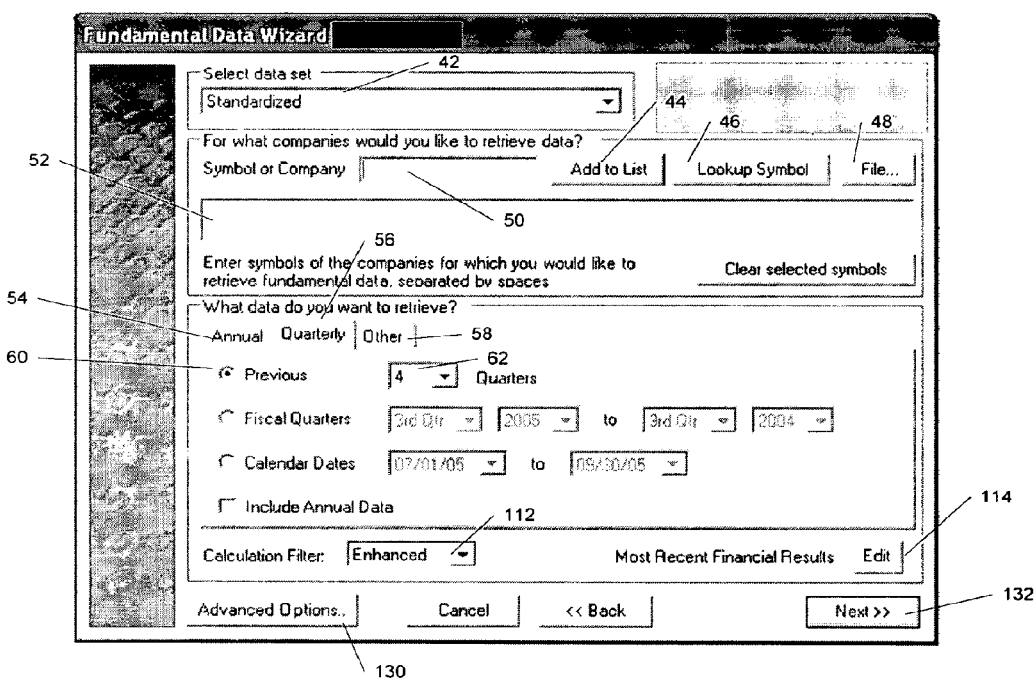

The screen shown in FIG. 4B is the primary interface for requesting data. The user is given an option to select a type of data set they would like to select. For example, using pull down menu 42, the user is given an option to select Standardized, Summary Fundamentals or As Reported data sets. Standardized is a data set that includes information which has been converted into standard XBRL. Summary Fundamentals is a summary data set or summarized version of the Standardized data set. That is, the format of Summary Fundamentals is XBRL, but the number of data points is standardized at 75. This data set is particularly useful for users who want to analyze companies on a high end basis. The As Reported data set leverages the naming conventions and structure of a company's filing. For example, for each company selected, a dataset is provided which includes the actual labels that were used within the company's filings with the SEC as well as the associated data. The As Reported data set is XBRL created by an online financial data web service such as Edgar Online, from documents filed with the SEC. The As Reported data set can be useful for analysts who cover a particular company and need to understand the labels and values a company is using to represent their financials. It should be noted that since different companies often use different conventions and structure for their company filings, the As Reported data set can generally not be used to compare one company to another company. Although not shown, the present system can also provide an option to select a SEC Filed dataset which enables users to request and retrieve data from XBRL financials that were filed by companies directly as XBRL documents with the SEC.

The system also allows the user to enter one or more company ticker symbols separated by spaces in the Symbol box 50 or the selection text box 52. Pressing Add to List button 44 adds the entered companies to a list of companies in the system. The user can also enter a list of company symbols separated by spaces in the company symbol input box 50 or in the selection text box 52 and click on the Add to List button 44 which will add each of the companies to the system. The user can also provide a range of cells from the spreadsheet that includes company ticker symbols into box 50. Pressing Add to List button 44 then adds those companies to the system's list. If the ticker symbol of a company is not known, pressing Lookup Symbol button 46 will prompt the user to input the name of a company. The system will then perform a lookup to determine the appropriate ticker symbol for the company and present that information to the user. The system can access the ticker symbol information online using an appropriate database search engine or can have the information already loaded locally into the computer the system is running on and perform the search locally. Selecting File button 48 allows the user to select from an existing file of company ticker symbols.

Figure 4C:
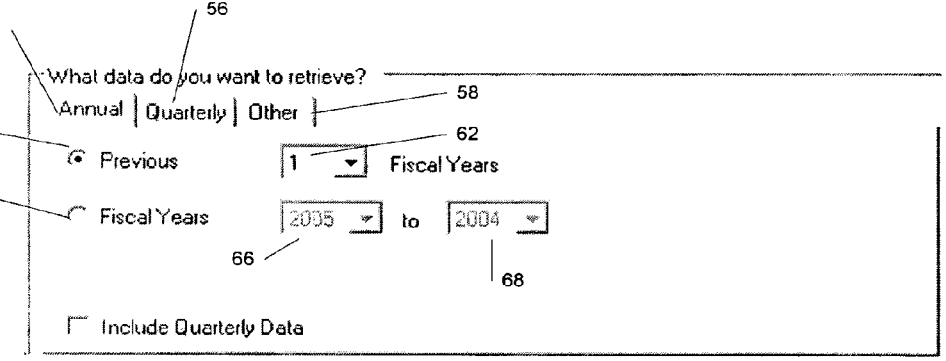

After a company or companies have been selected, the user can select the period for which they would like to examine data. For example, the user is given an option to select the period by clicking on one of the Annual (54), Quarterly (56) and Other (58) tabs. When the Annual tab 54 has been selected, the user is presented with a window giving the user several options for selecting data as shown in FIG. 4C. For example, selecting Previous button 60 allows the user to request the last X number of fiscal years of annual data, where X is a number of years input by the user in box 62. It should be noted that the system will only return data for years for which data exists. For example, if a user requests four years of fiscal data and only two years worth of data was ever filed, only those two years of data will be returned and displayed. In the alternative, the user is given the option to select Fiscal Years button 64 and to enter the years for which they would like data, in boxes 66 and 68. Checking the Include Quarterly Data button 70 allows the user to retrieve the quarterly data associated with the annual data that has been selected.

Figure 4D:
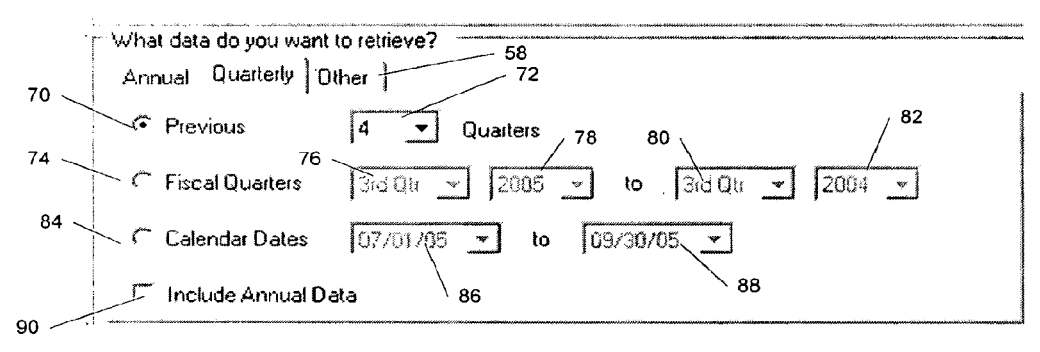

Selecting the Quarterly tab 56, the user is also given several options for selecting data as shown in FIG. 4D). For example, the user can select Previous button 70 and enter the number of quarters in box 72 for which data is desired. Selecting the Fiscal Quarters button 74, the user can request data between any two fiscal quarters input by the user in boxes 76-82. Selecting the Calendar Dates button 84, the user can request data for quarters that occurred between the two dates input by the user in boxes 86, 88. Checking box 90 will retrieve annual data that may have been filed between the selected quarters.

Figure 4E:
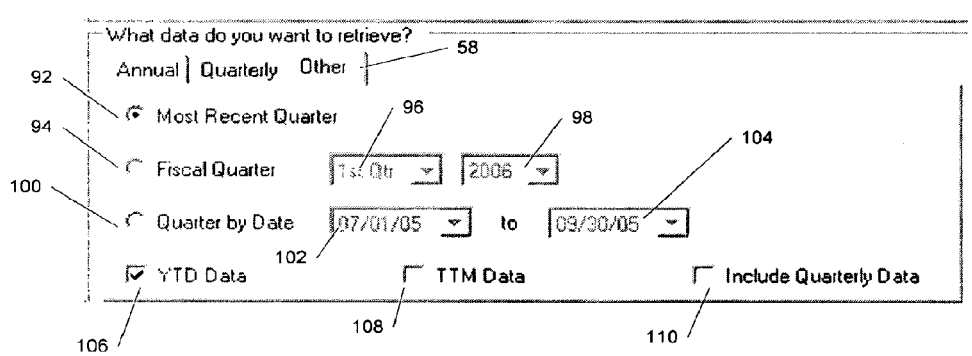

Selecting the Other tab 58 allows the user to request data for year to date and trailing twelve month periods using the window shown in FIG. 4E. For example, selecting the Most Recent Quarter button 92 allows the user to select the most recent quarter of data. Selecting the Fiscal Quarter button 94, allows the user to select the specific fiscal quarter input by the user in boxes 96, 98. Selecting the Quarter by Date button 100, allows the user to select a specific quarter by the dates input by the user in boxes 102, 104. The user is also given the option to select data types. For example, checking YTD Data box 106, the user can request consolidated data for the current fiscal year. Checking TTM Data box 108, the user can request data for the trailing twelve months (e.g., the sum of the last four quarters). Checking the Include Quarterly Data box 110, the user can retrieve quarterly data for the selected period.

Returning to FIG. 4B, the user can also select what type of data is returned using the Calculation Filter drop down menu 112 which gives the user options None, Enhanced or Preferred. Selecting None, the system only returns values for elements that have been provided by the reporting company. Selecting Enhanced returns values for elements that have been provided by the reporting company or have been rolled up (calculated)) as per U.S. Generally Accepted Accounting Principles (US GAAP) by an online company such as, for example, EDGAR Online. Selecting Preferred returns values for elements based upon US GAAP accounting rules. With the Preferred option, company provided roll-ups will be overwritten. The "Preferred" option presents a US GAAP representation of a company's financials.

Figure 4F:
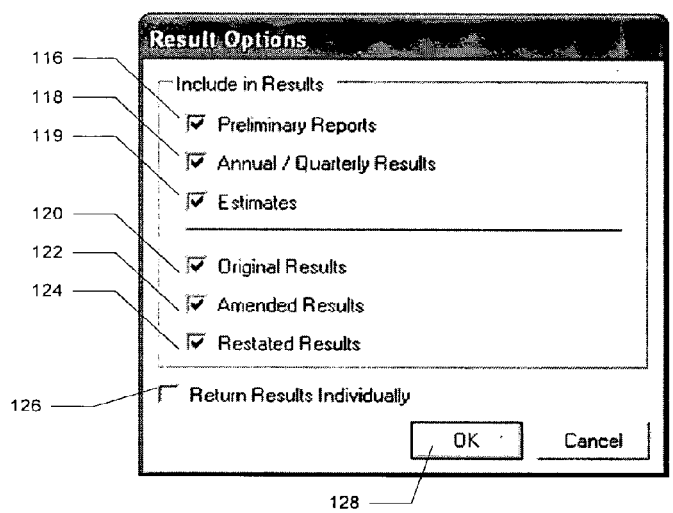

By default, the system will always return the most recent data available for a company. However, the user can modify this behavior by clicking on the Most Recent Financial Results Edit button 114 which then presents the user with a Result Option. menu as shown in FIG. 4F. This menu allows the user to select the source and types of data to include in the results and can be used to retrieve virtually any type of available data from any type of available document including, for example, non-SEC sources. The following are just examples of the types of data that can be retrieved. Embodiments of the present disclosure are, of course, not limited to the shown examples. The user can select data types by checking the Preliminary Reports box 116 and/or the Annual/Quarterly Results box 118 and/or Estimates box 119. Selecting Preliminary Reports box 116, will return preliminary fundamental data derived from 8K earnings releases in the result, Selecting Annual/Quarterly Results box 118 will include fundamental data derived from 10K, 10K/A, 10Q, 10Q/A as well as 20F, 40F and 6K foreign filing data in the result. The retrieved information may also include information derived form S1, S1/A, etc. captured from information provided by new issuers. Selecting Estimates box 119 will include earning estimate information in the data returned. By default, both the Earning Releases and the Annual/Quarterly Results options are selected. Data filters can also be selected by checking Original Results box 120, Amended Results box 122 and/or Restated Results box 124. Checking Original Results box 120 will include data from the originally filed 10K or 10Q in the result, Checking Amended Results box 122 will include data filed in a 10K/A or 10Q/A in the result. Checking Restated Results box 124 will include data from a restated 8K, 10K or 10Q in the result. By default, each of these data filters is selected so that original, restated and amended data will be returned unless otherwise specified by the user.

In addition, by default, the system will return results in a single column of data for each of the selected period(s). The column of data is derived from the most recent data based upon the criteria selected. In the alternative, however, the user can check Return Results Individually box 126 to see each of the options included in the results listed in individual columns for the selected period. This will return all results for the selected, time period, and not just the most recent. When all selections have been made, pressing the OK button 128 will save the selections for this and all future queries until changed.

Figure 5:
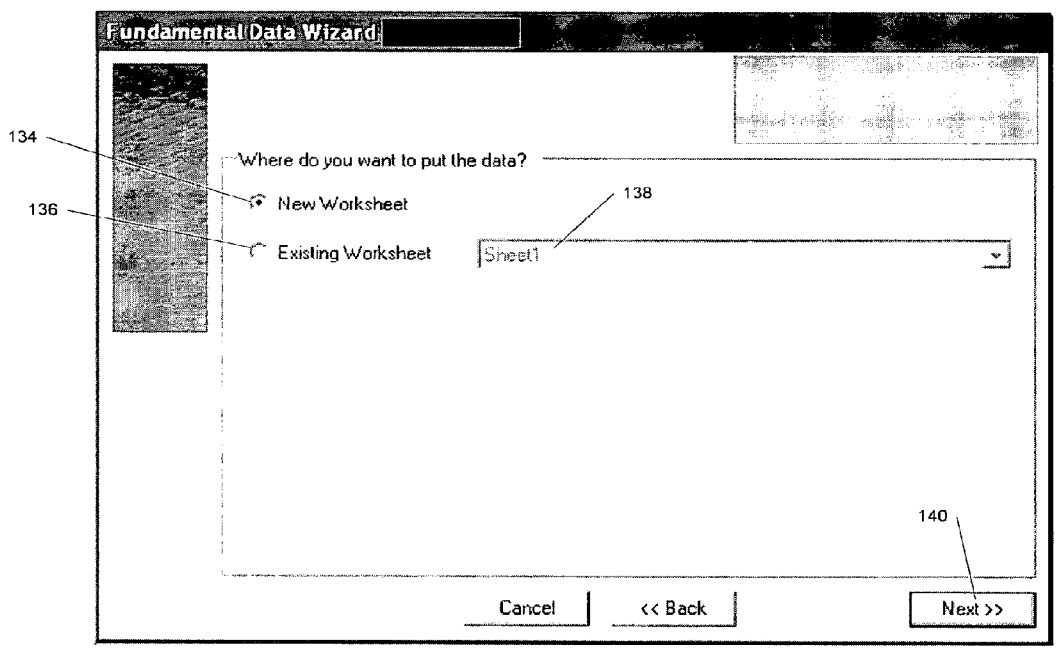

Returning to FIG. 4B, Advanced Options button 130 allows the user to personalize the way content is displayed in the spreadsheet, After all selections are made in these windows, clicking Next button 132 brings the user to a window such as that shown in FIG. 5, which allows the user to have the results placed in a new worksheet (button 134), or an existing worksheet (button 136). When selecting an existing worksheet, pull down box 138 will present the user with a list of all available worksheets from which the user can choose.

According to an embodiment of the present disclosure, when selecting an existing worksheet, the system will overwrite the contents of the worksheet with the results of the query.

Figure 6:
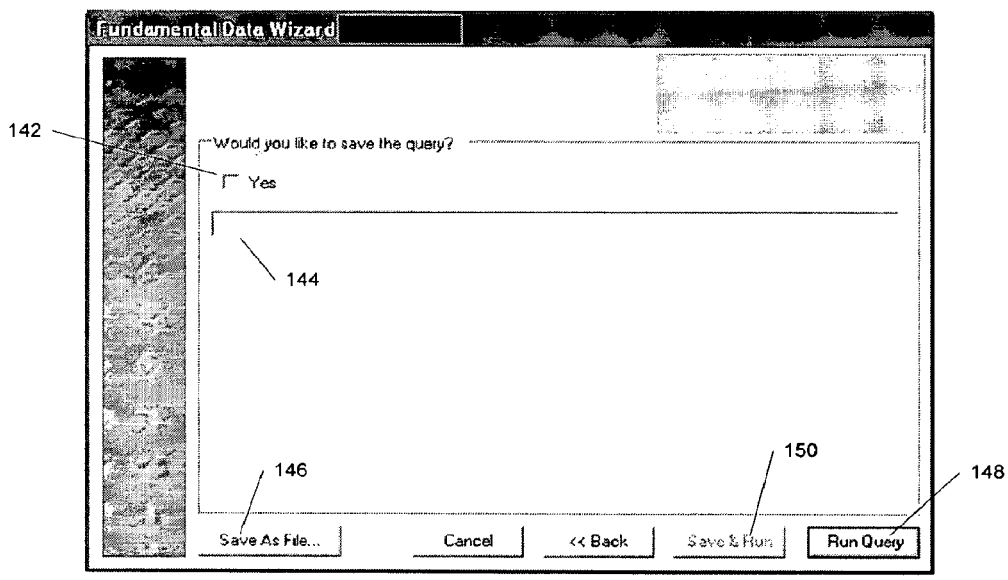

After completing this window, clicking Next button 140 brings the user to a window such as that shown in FIG. 6 which allows the user to save the query so that it can be run again in the future. If the user does not desire to save the query, the query can be run by clicking on Pull Query button 148 in which case the query will be run and the information will automatically populate into the spreadsheet. If the user desires to save the query, after checking the Yes box 142 and inputting a query title in box 144, the query can be saved by clicking on the Save As File button 146. Clicking on Save & Run button 150 will then save and run the query, with the information automatically populating into the spreadsheet.

Figure 7:
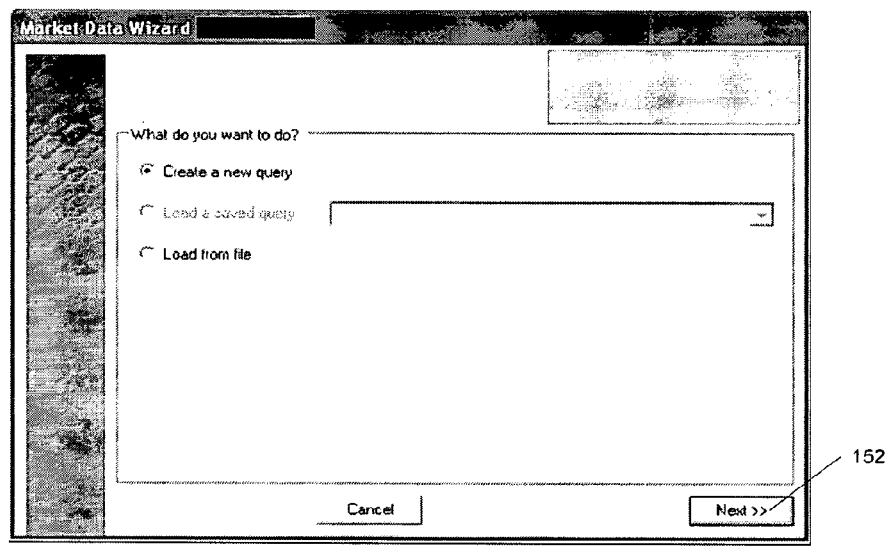

Returning to FIG. 3, according to an embodiment of the present disclosure, a user may choose a Market Data Wizard by highlighting and selecting Market Data Wizard 14 from main menu 12. Upon selecting the Market Data Wizard, the user is presented with a screen such as that shown in FIG. 7. This screen allows a user to load and run an existing query or to create a new query and is similar to the Fundamental Data Wizard window shown in FIG. 4A.

Figure 8A:
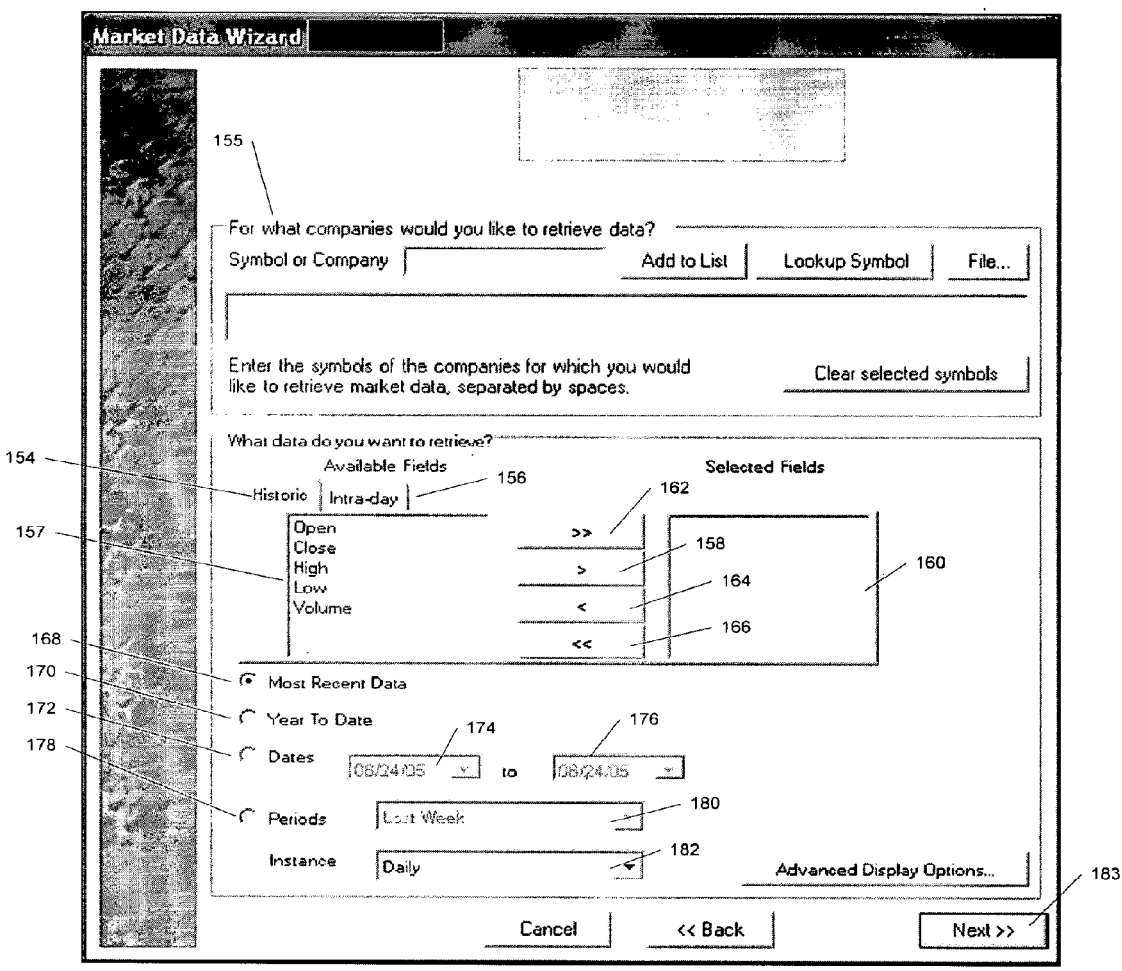
Figure 8B:
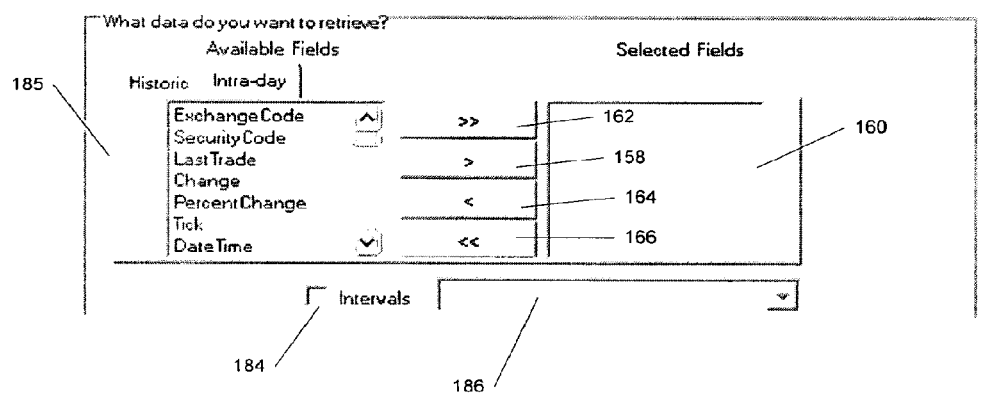
Figure 8D:
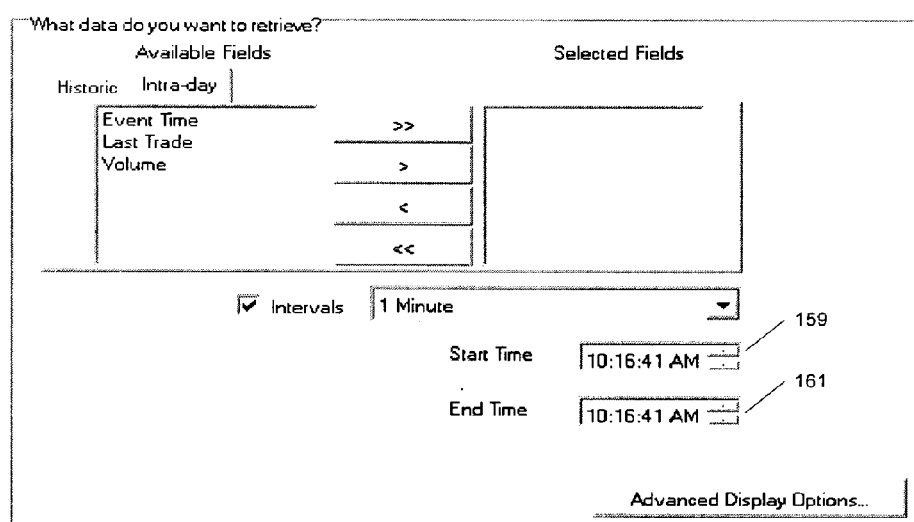

After a selection is made and the Next button 152 is pressed, the user is presented with a screen such as that shown in FIG. 8A which is the primary interface for requesting market data.

The user enter a company ticker symbol, search for a company by name, or load a comma separated tile of company tickers using the inputs 155 in a manner similar to that described above with respect to FIG. 4B. The user can then select what data to retrieve. The market data type tabs on the screen allow the user to select historical data (Historical tab 154) or intraday data (tab 156), with historical data being the default selection. Selection of the Historical tab 154 allows the user to identify the field of data (from window 157) to retrieve from a service provider such as, for example, EDGAR Online. The user can select from several fields including "Open" which will return the opening stock price, "Close" which will return the closing stock price, "High" which will return the Highest stock price, "Low" which will return the lowest stock price and "Volume" which will return the amount of shares traded. Highlighting a field and clicking on the >button 158 will add that field to the requested data and that field will be displayed in the Selected Fields area 160. Highlighting a field and clicking the <button 164 will remove a field from the list of requested data. Clicking on >> (162) or << (166) adds or removes the entire list of available fields. Selecting the Most Recent Data button 168 will request the most recent pricing information. Selecting the Year to Date button 170 will request the highest stock price listed by day for the year to date. Selecting the Dates button 172 will request the stock pricing for the specific time period input by the user into boxes 174, 176. Selecting the Periods button 178 will select from preset time frames. Drop down menu 180 gives the user the option of selecting the following time frames: last week, last month, last 3 months, last 6 months, last year, last 3 years, last 5 years, last 10 years. The Instance field 182 will return data for one day during the period selected. The user can select from the following periods: Daily, Weekly or Monthly. For example, if the user is asking for the closing price for one year period and selects Weekly, the query will return the closing price for one day per week for that period.

Selecting the intraday tab 156, the user is presented with a Screen such as that shown In FIG. 8B which allows the user to identify the type of data to retrieve from the online service provider. The available fields are displayed in window 185. The available fields and their descriptions are shown in FIG. 8C. Highlighting a field and clicking on the >button 158 adds the field to the requested data and displays the field in Selected Fields window 160.

Highlighting a field and clicking the <button 164 removes the field from the list of selected fields. Just clicking on >> button 162 or <<button 166 adds or removes the entire list of available fields. Checking the Intervals box 184 allows the user to retrieve data since market open in specific intervals including every 1, 5, 30 and 60 minutes. These intervals are displayed in pull-down menu 186. According to an embodiment of the present disclosure, when an interval is selected, the user is only given the option to select from the following fields: Event Time, Last Trade price and Volume. Once the interval is selected, the user can select a start time (159) and end time (161) for which they want to retrieve data. Once the user has made all of their selections, clicking on a Next button 183 (FIG. 8A) will take the user to a screen similar to that shown in FIG. 5, allowing the user to specify where the results should be displayed and then to a screen similar to that shown in FIG. 6 allowing the user to save the query so that it can be run again at a later time.

Embodiments of the present disclosure provide several methods for the retrieval of data into a spreadsheet such as Microsoft Excel. One method is to add a function call, This allows users to select a specific field of data and place it in a selected cell of the spreadsheet. There are several ways to add a function call to a cell. According to an embodiment, of the present disclosure, this can be done directly by writing a function call by typing in the function name and parameters. According to another embodiment:, this can be done using a function builder to retrieve data. In either case, the function call can be used to retrieve both fundamental and market data into the spreadsheet.

Writing a function call to retrieve fundamental data will now be described. Retrieving fundamental data, the function call uses required and optional parameters. This information includes symbol, dataset, field, type, year, quarter, filter, eligible and reports.

The symbol information refers to the ticker symbol of the company the user would like to retrieve data for. The dataset information refers to the dataset the user would like to retrieve date from. The datasets include, for example, Standardized XBRL Dataset (STD), Summary XBRL Dataset (SUM) and As Reported Dataset (SCPEC), and SEC filed which is XBRL, filed by a company with the SEC. The field information refers to the XBRL field the user would like to retrieve from the selected dataset. The type information refers to the type of data the user would like to retrieve. The user has the option of the type (Type) of data to retrieve. For example, the user can specify Annual (A), Quarterly (Q), Trailing Twelve Months (T) and Year to Date (Y) data as desired. The year information refers to the fiscal year the user would like to retrieve data for. The user has the option of specifying a specific year, or selecting from several mnemonics including, for example, the last fiscal year (FY), the last fiscal year—1 (FYI), the last fiscal year—2 (FY2), the last fiscal year—3 (FY3) and the last fiscal year—4 (FY4). The quarter information refers to the fiscal quarter the user would like to retrieve data for. The user has the option of specifying a specific quarter (e.g., fiscal quarter 1, 2; 3 or 4). The user also can also select from several mnemonics including, for example, last fiscal year (FQ), Last Fiscal Year—1 (FQ1), Last Fiscal Year—2 (FQ2), Last Fiscal Year 3 (FQ3), Last Fiscal Year—4 (FQ4) Last Fiscal Year—20 (FQ20). The Fiscal Quarter parameter is required if the user sets the Type="Q", "T", or "Y". If the user sets Type="A" they do not have to provide a Quarter parameter. The filter information refers to the calculation view the user would like to apply to the results. Options include, for example, None (A), Enhanced (C) and Preferred (P). If the user does not specify a filter, the system will default to Enhanced. The Eligible Reports information allows the user to specify the type of information to include in the results. By default the system will return the most recent data available for the specified period. However, available options include, for example, RCNT (the default if not otherwise specified), which returns the most recent report for the selected period. PRELIM will include preliminary results (8K earnings releases) in the result. ORIG will include original filed results for the selected period in the result. AMEND will include amendments for the selected period in the result. RESTATE will include restated information for the selected period in the result. AUDIT will only include audited information for the selected period in the result. More than one option can be specified by separating them by commas. Each of the flags has three states: Include, Positive and Negative. The Include state indicates to not use the flag in generating the results. This is the default option and to specify this option the user does not specify the flag. A Positive state will only return results that match the flag. To return results that match the flag, this option is specified in the eligible reports parameter. A Negative state indicates to never return results that match the flag. To return results that do not match the flag, the user can specify this option in the eligible reports parameter prefaced with an exclamation point "!".

If, for example, the user wanted to request only audited results, they would set the eligible reports parameter to "AUDIT". If the user does not want to retrieve preliminary information they would set the parameter to "!PRELIM". If they would like to retrieve only preliminary information they would set the parameter to "PRELIM". If they would only like to retrieve restated information they would set the parameter to "!ORIG, !AMEND". The reason a user would select "!ORIG, !AMEND" is when they do not want to ignore the ORIG and AMEND flags but rather only include values where neither are true.

Figure 9:
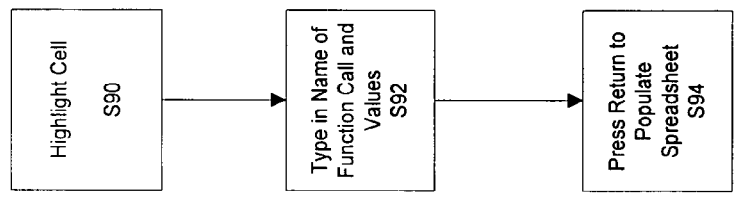
FIG. 9 is a flow chart for describing a method for entering, a function call directly into a cell of a spreadsheet.

According to another embodiment of the present disclosure, the user can type the function call directly into the cell, following the procedure shown in FIG. 9. The user first highlights the cell where the function call is to be added (Step S90). The user then types in the name of the function call followed by values it parenthesis (Step S92). For example, if the user wanted to retrieve Operating Revenue for Microsoft for the $3^{rd}$ Quarter of 2003, the user would enter the following information into the spreadsheet cell:

=FD("MSFT", "STD", "usfr-pt:OperatingRevenue", "Q", 2003, 3, "C")

Once the function call has been entered, pressing the Enter button retrieves the data and populates the cell with the value (Step S94). It should be noted that if no value is returned and the Internet connection is active, the company has not filed a value for the requested field.

According to another embodiment of the present disclosure, a function call can be written to retrieve market data. When retrieving market data, the function call takes the following required and optional parameters: Symbol, Dataset, Field and Date.

The Symbol parameter refers to the ticker symbol of the company the user would like to retrieve data for. The Dataset parameter refers to the dataset the user would like to retrieve data. from. The available datasets include Historical Dataset (HIST) and Intraday Dataset (INTRA). The Field parameter refers to the field the user would like to retrieve. For the Historical Dataset, the fields include Opening Price (OPEN), Closing Price (Close), Daily High (HIGH), Daily Low (LOW) and Daily Volume (VOLUME). For the Intraday Dataset, the fields include ExchangeCode, SecurityCode, LastTrade, Change, PercentChange, Tick, DateTime, Time, Ask, Bid, High, Low, Open, Volume, AnnHigh, AnnLow, Dividend, EPS, Close, PE, Yield, Delay, Halt, Beta, TSO and MarketCap. Date is an optional parameter for specifying the date associated with the data the user would like to retrieve. The format may be entered, for example, as MM/DD/YYYY HH:MM.

The user can type the function call directly into the cell. To do so, highlight the cell where the function call should be added and type the name of the function call followed by values in parenthesis. For example, if the user wanted to retrieve Open price for Microsoft for Apr. 28, 2005, the user could enter the following information into the spreadsheet cell:

=FD("MSFT", "HIST", "OPEN", "4/28/2005")

If the user wanted to retrieve today's open price, the user could enter the following information into the spreadsheet cell:

=FD("MSFT", "INTRA," "OPEN")

Once the user has entered the function call, pressing the Enter button will retrieve the data and populate the cell with the value. Again, it should be noted that if no value is returned and the user's Internet connection is active, the company has not filed a value for the requested field. In addition to including direct values as the parameters to the function call, the user can reference other cells in the spreadsheet.

Figure 10A:
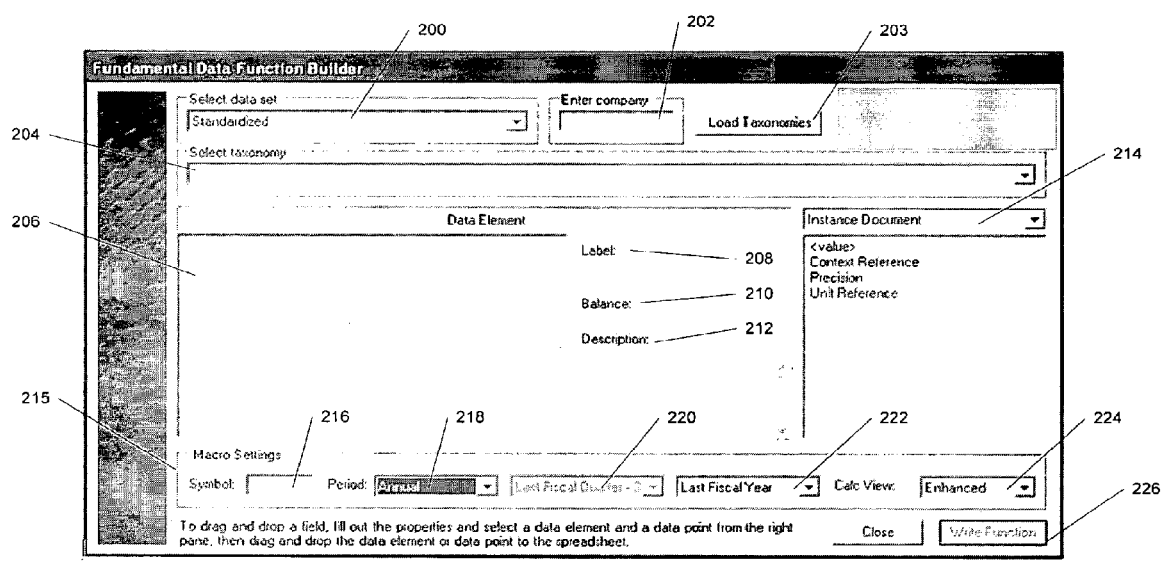
FIGS. 10 and 10B are screen shots for describing aspects of a Fundamental Data Function Builder according to embodiments of the present disclosure.

According to another embodiment of the present disclosure, a function builder may be used to retrieve fundamental data. A Fundamental Data Function Builder guides the user through the process of creating function calls and placing them in cells. This enables users to quickly and easily retrieve individual data. elements and include them in custom templates and models. To access the Fundamental Data Function Builder, from main menu 12 (FIG. 3), the user selects Fundamental Data Function Builder 15. This will launch the Fundamental Data Function Builder which consists of one screen as shown in FIG. 10A.

The Fundamental Data Function Builder includes several sections which help the user to retrieve the data they are interested in. For example, Select Data Set pull down menu 200 allows the user to select the data set that they would like to retrieve the data from. Available datasets include, for example, Standardized which is the US GAAP Standardized Dataset, Summary Fundamentals which is the summarized version of the Standardized dataset and As Reported which is a dataset leveraging the naming conventions and structure of the company's filings and SK Filed which is XBRL filed by a company with the SEC.

According to an embodiment of the present disclosure, not all users will be presented with the same options. That is, according to this embodiment, the list shown in pull down menu 200 will only be populated with the datasets to which the user subscribes.

Figure 10B:
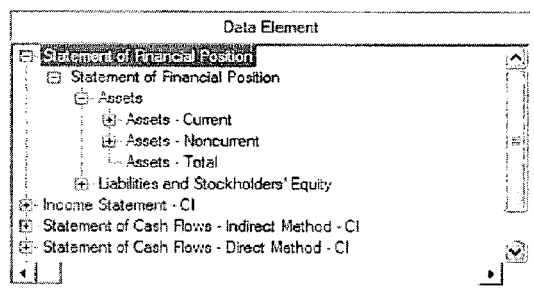

Taxonomy in essence is a data dictionary. As mentioned above, different companies may use different taxonomies for their data. By entering a company (e.g., company ticker symbol) into box 202, a user can load the taxonomy or taxonomies associated with the company the user is analyzing. When analyzing multiple companies, the user should select one of the companies to use. Once the company's ticker symbol or a cell location which contains the company's ticker symbol is entered into box 202, clicking on the Load Taxonomies button 203 will load the available taxonomies for that company. A list of taxonomies associated with each. company can be stored at the users location (for example, on the user's computer system or locally accessible by the user's computer system) or can be stored at an online data provider such as EDGAR Online and later retrieved by the present system. According to an embodiment of the present disclosure, the present system will display the URL(s) to the taxonomies associated with the company in a drop down list 204. In addition, according to an embodiment, the present system will load a list of elements available in this taxonomy. Data Element area 206 displays all of the elements included in the selected data set. An example of a data set is shown in FIG. 10B. Selecting elements with + signs next to them will expand the tree and display each elements children.

In the center of the screen (FIG. 10A), information is displayed that is tied to the selected data element. This information includes, for example, the full Label 208 for the data element, the type of Balance 210 (debit or credit) and the financial definition or Description 212 of the data element. The information is displayed next to the appropriate heading.

Pull down menu 214 is referred to herein as the linkbase selector and allows the user to select the type of information about the element which they would like to retrieve through the function call. The user can select from several options including Instance Document which is the default option. As shown in FIG. 10A, selecting Instance Document then allows the user to select <value>, Content, Reference, Precision and Unit Reference. The parameter <value> is the default, and will return the value associated with the element. Context Reference will return the context identifier associated with the element. Precision will return the precision that should be applied to the value. Unit Reference will return the units the value is being displayed in (e.g., USD, JPY, . . . ) Other options that can. be selected in pull down menu 214 include Taxonomy Which allows the user to select attributes associated with the taxonomy, Calculation Linkbase which allows the user to select attributes that define how information has been calculated, Label Linkbase which allows the user to select attributes system. According to an embodiment of the present disclosure, the present system will display the URL(s) to the taxonomies associated with the company in a drop down list 204. In addition, according to an embodiment, the present system will load a list of elements available in this taxonomy. Data Element area 206 displays all of the elements included in the selected data set. An example of a data set is shown in FIG. 10B. Selecting elements with + signs next to them will expand the tree and display each elements children.

In the center of the screen (FIG. 10A), information is displayed that is tied to the selected data element. This information includes, for example, the full Label 208 for the data element, the type of Balance 210 (debit or credit) and the financial definition or Description 212 of the data element. The information is displayed next to the appropriate heading.

Pull down menu 214 is referred to herein as the linkbase selector and allows the user to select the type of information about the element which they would like to retrieve through the function call. The user can select from several options including Instance Document which is the default option. As shown in FIG. 10A, selecting Instance Document then allows the user to select <value>, Content, Reference, Precision and Unit Refer ice. The parameter <Value> is the default, and will return the value associated with the element Context Reference will return the context identifier associated with the element. Precision will return the precision that should be applied to the value. Unit Reference will return the units the value is being displayed in (e.g., USD, JPY . . . ) Other options that can be selected in pull down menu 214 include Taxonomy Which allows the user to select attributes associated with the taxonomy, Calculation Linkbase which allows the user to select attributes that define how information has been calculated, Label Linkbase which allows the user to select attributes that describe the field (such as labels as descriptions), Presentation Linkbase which allows the user to select attributes that describe how elements relate to each other (parents, children), Reference Linkbase which allows the user to select attributes that provide reference information about the data and Company Information such as name, address, exchange, etc.

Once the user has selected the information they are interested in, Macro Settings portion 215 of the display allows the user to select the company, period, etc. for which they would like to retrieve data. Specific options include, for example, Symbol 216 in which the user can input the symbol of the company to retrieve data for and Period 218 in which the user can indicate the specific period they are interested in. In particular, dropdown menu 218 allows the user to choose from Annual to retrieve annual data, Quarterly to retrieve quarterly data, Trailing Twelve Months to retrieve trailing twelve month (TTM) data and Year to Date to retrieve Year To Date (YTD) data.

The user can also select, using drop down list 220, the specific fiscal quarter the user would like to retrieve data for. For example, the user can select the last fiscal quarter or any of the previous fiscal quarters from the current fiscal quarter from the drop down list 220. The user can also select, using drop down list 222, the fiscal year the user would like to retrieve data for. For example, the user can select a specific year, or select the last fiscal year from the drop down list 222 to retrieve annual data, quarterly data, trailing twelve month (TTM) data or Year To Date (YTD) data. Calculation View drop down list 224 allows the user to select the calculation filter the user would like to apply to the result. The Calculation View drop down list 224 is only available when the attribute <value>. This drop down list, when available allows the user to select None which only returns values for elements that have been provided by the reporting company. Enhanced which returns values for elements that have been provided by the reporting company or have been rolled up (calculated) as per US GAAP by a data provider such as, for example, EDGAR Online, Preferred which returns values for elements based upon US GAAP accounting rules (company provided roll-ups will be overwritten) which presents a US GAAP representation of a company's financials.

After all fields are filled where appropriate, clicking on the Write Function button 226 will write a function call to the currently highlighted cell, if no cell is highlighted the user should select a cell with the mouse and then press the Write Function button 226. Once pressed, the results will be retrieved and displayed in the selected cell. Users are also given the ability to select an item in the drop down menu 214 and drag the item to a cell on the spreadsheet.

Figure 11:
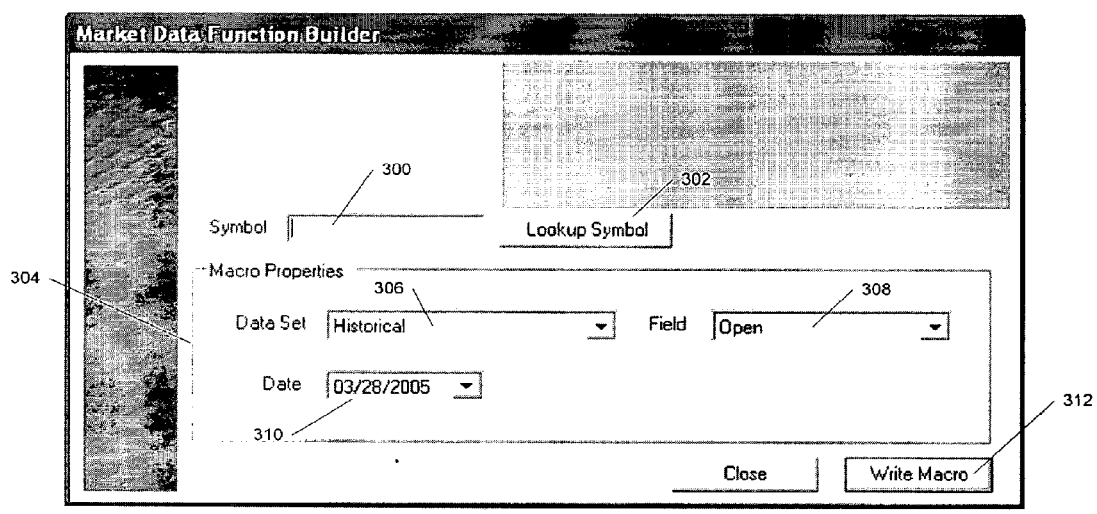
FIGS. 11 and 12 are screen shots for describing aspects of a Market Data Function Builder according to embodiments of the present disclosure.

A function builder may also be used to retrieve market data. Clicking on the Market Data Function Builder button 16 from the main menu (FIG. 3) selects the Market Data Function Builder. The Market Data Function Builder allows the user to create a function call that retrieves the market data for a company and places it in a user defined cell. An example of a Market Data Function Builder is shown in FIG. 11.

The user first highlights or otherwise selects the cell in the spreadsheet where the user would like the data to he placed. The user then inserts the Symbol (or a cell reference that contains the symbol) of the company for which the user would like to retrieve data, into box 300. The user can also lookup a company symbol using button 302. The user can then define the Macro Properties in area 304. Pull down menu 306 allows the user to retrieve data from a chosen dataset. The datasets the user can choose from include a Historical Dataset and an Intraday Dataset. Field 308 allows the user to use a pull down menu to select a field to retrieve from. When Historical Dataset is chosen, the user is given the option of selecting from the following fields: Opening Price, Closing Price, Daily High, Daily Low and Daily Volume. The user can then select the date for which they would like to retrieve data by entering it into box 310. When Intraday Dataset is chosen, the user can select from the following fields: ExchangeCode, SecurityCode, LastTrade, Change, PercentChange, Tick, DateTime, Time, Ask, Bid, High, Low, Open, Volume, AnnHigh, AnnLow, Dividend, EPS, Close, PE, Yield, Delay, Halt, Beta, TSO and MarketCap. After entering the above-described information, by clicking on the "Write Macro" button 312, the data will be retrieved and placed into the selected cell in the spreadsheet.

Figure 12:
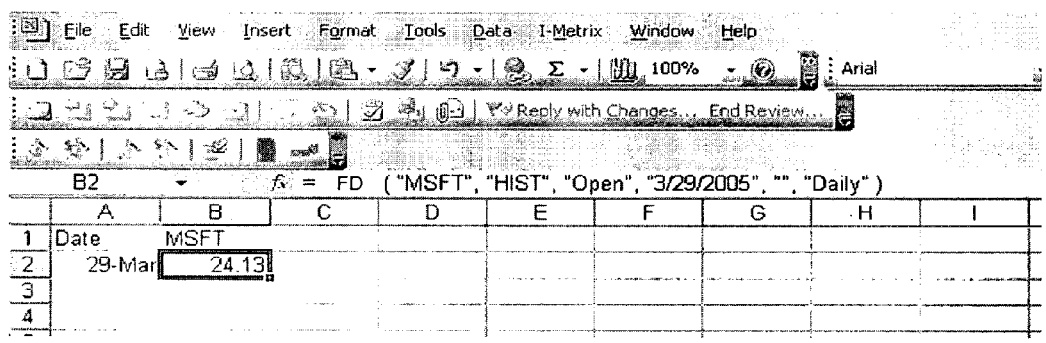

The wizard creates a function call $1 in the cell to retrieve the data for the stock price, as shown in FIG. 12. In the example shown, the function call will retrieve the opening date price for Microsoft on Mar. 29, 2005. As shown in column B, row 2, the spreadsheet is populated with the opening price on that day of $24.13.

Another option on main menu 12 (FIG. 3) is Sheet Properties 17. The Sheet Properties option is used to view the properties of an active worksheet that is currently being displayed and is used to make a new request or to view/update a request that was previously made. For example, Sheet Properties allows a user to modify the properties of previously requested data or to select new data into a worksheet currently being displayed. The Sheet Properties window is similar to the second screen of the Fundamental Data Wizard shown in FIG. 4B. Using the Sheet Properties window, the user can modify or make selections exactly as described above with respect to the Fundamental Data Wizard screen shown in FIG. 4B. Accordingly, operation of the Sheet Properties window will not be further described in detail herein. Once the user is satisfied with the selections, pressing the Run Query button will retrieve the results into the active worksheet. Any contents found in the active worksheet will be over-written.

The Login/Switch User 18 menu option (FIG. 3) allows the user to work offline or another user to access data. The Connect Management Option 19 menu option allows a user to enable application logging, easily remove downloaded files and to modify the location of the online web service being used.

Once the data has been retrieved, embodiments of the present disclosure allow the user to perform a number of functions. For example, according to an embodiment of the present disclosure, the user can link back to an original document that shows exactly what document and from where in the document a particular value was retrieved. This is referred to herein as a linkbase feature. To activate this feature, the user right clicks on a cell containing the value of interest. FIG. 13A shows an example of a spreadsheet created by a user utilizing the present disclosure that. displays Cash and Cash Equivalents for Microsoft for 2004. Upon right clicking on the value $14,304,000,000, a menu will be displayed as shown. Clicking on "Go to source document" will then launch a window that will display the reported filing from which the value was retrieved, an example of which is shown in FIG. 13B. As shown, the value was retrieved from a "Cash and Equivalents" column of 10-K Filing dated Aug. 26, 2005. According to an embodiment of the present disclosure, the column containing the value of interest is highlighted for ease of reference.

FIG. 14 is a screen shot of a spreadsheet according to an embodiment of the present disclosure, showing the financials of several corporations being displayed side by side allowing a user to perform an easy comparison. Column 440 describes the various elements shown in the spreadsheet. Columns 442-446 are the company financials for each of the three companies being analyzed.

According to another embodiment of the present disclosure, a financial data system is capable of displaying various types of information associated with the main financial information being displayed. For example, according to an embodiment of the present disclosure, a system allows users to view footnote information as it relates to different types of tabular data shown in the main body of a report.

Documents such as financial documents often include information besides that in the main body of the document. This information is referred to herein as "associated information". This associated information may include, for example, footnotes, head notes, management discussion, etc. Although the associated information may not be included in the main body of the financial document, it may nevertheless contain important information that can be useful when evaluating the financials of a company.

According to an embodiment of the present disclosure, a text file for each document, which includes the associated information section(s), is broken down into a list of sentences. Each sentence is marked and has an associated category and document identifier applied to it to allow it to be re-inserted later in the document and highlighted. This information allows the user to later view the associated information in its proper context.

FIG. 15 is an example of a footnote section of a financial document. Although not shown in FIG. 15, the footnote section is entitled "Notes To Consolidated Financial Statements" and is annexed to the end of the financial statement for a company called ABC Co. The information contained in the footnote section, although relatively meaningless on its own when taken out of context, is relevant when taken in context with the associated information from the main body of the financial document.

According to an embodiment of the present disclosure the footnote textual data, can be parsed out of the document, processed and later displayed in relation to information (e.g., XBRL elements) from the main body of the document. The footnote data is connected to one or more XBRL categories, allowing the user to quickly view the footnote data in context with the corresponding XBRL element.

The information in financial documents can vary depending on the specific type of document. For example, information in a corporate balance sheet can generally be broken down into one of the categories in the list shown in FIG. 16. The 23 categories (also referred to as data points) shown in FIG. 16 correspond to a Commercial and Industrial (C&I) taxonomy and in particular to XBRL labeled data in a Balance Sheet. Of course, the list can be expanded to include other categories such as, for example, Income Statement and Cash Flow Statement data, etc. in addition to data from Commercial and Industrial taxonomy other available XBRL taxonomies such as Oil and Gas, Real Estate, Insurance, etc. can be provided for.

As shown in FIG. 16, the categories include Assets which include Current Assets (e.g., Cash and Cash Equivalents, Short Term Investments, etc.) and Non Current Assets (e.g., Property Plant and Equipment, Long Term Investments, etc.). Liabilities include Current Liabilities (e.g., Accounts Payable and Accrued Expenses, Deferred Revenue, etc.), Non Current Liabilities (e.g., Long Term Debt, Long Term Capital Lease Obligations, etc.) and Retirement Obligations (e.g., Deferred Tax Liability, Minority Interest, etc.) As mentioned above, this list of categories can be expanded to include other categories such as Income Statement, Cash Flow Statement data, etc.

Data in the main body of the balance sheet is assigned to and XBRL labeled to correspond to one or more of the categories shown in FIG. 16, In addition, according to an embodiment of the present disclosure, the associated information (e.g. footnotes) can be parsed from the document, categorized and assigned to one of more of these categories so that the information can later be easily retrieved and put into context by a user of the financial data system.

Figure 17:
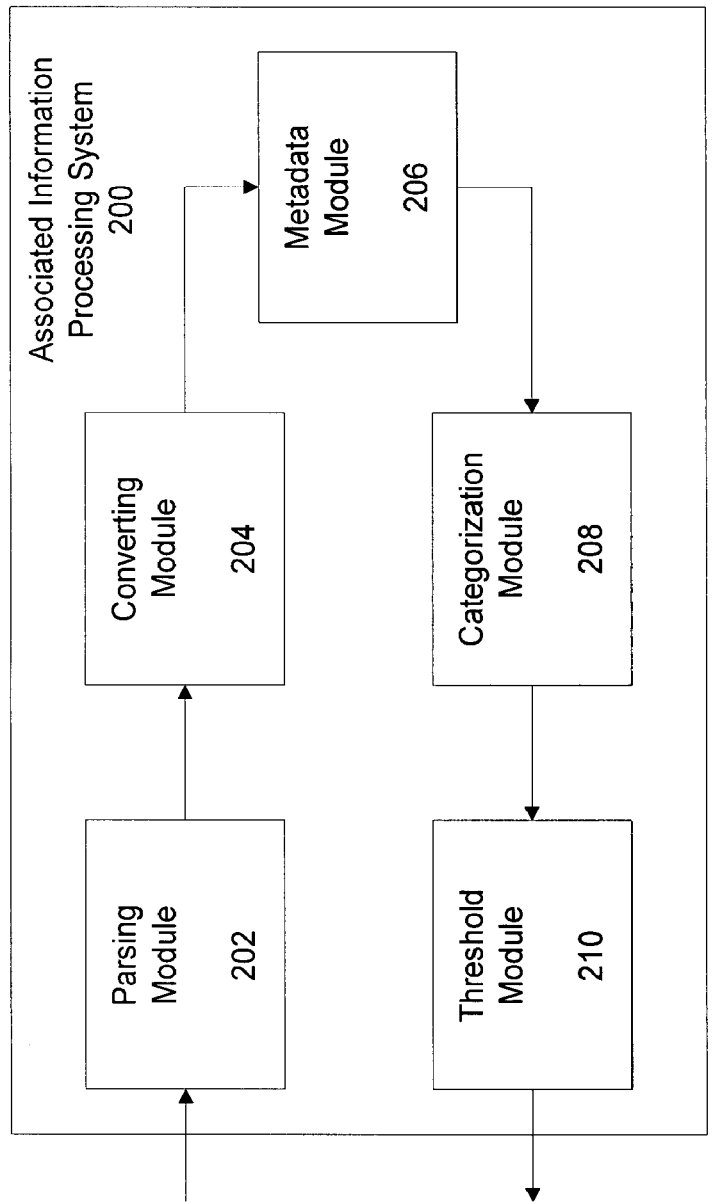
FIG. 17 is a block diagram for describing an associated information processing system according to an embodiment of the present disclosure.
Figure 18A:
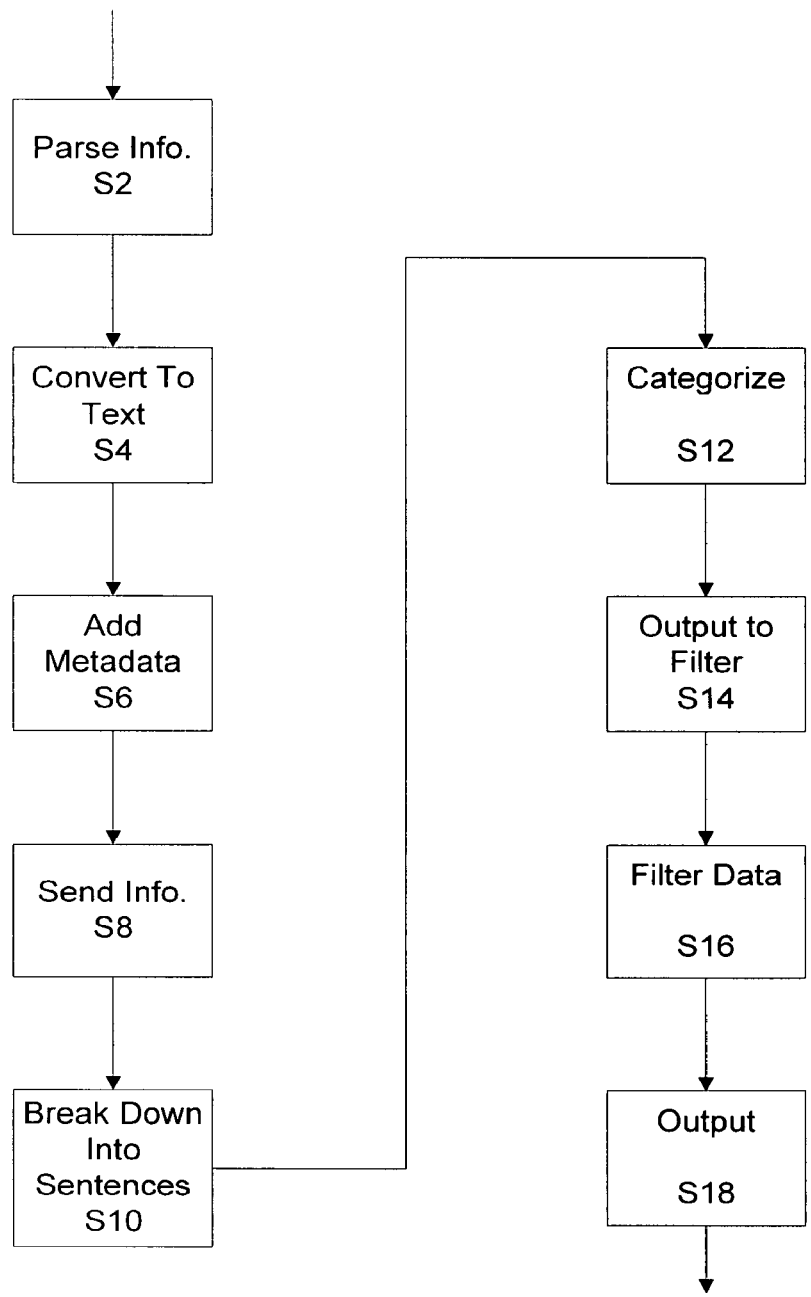
FIGS. 18A and 18B are flow charts for describing operation of an associated information processing system according to an embodiment of the present disclosure.

A system for categorizing associated information according to an embodiment of the present disclosure will now be described by reference to FIGS. 17 and 18. An Associated Information Processing System 200 according to an embodiment of the present disclosure, is shown in FIG. 17. Operation of system 200 will be described by reference to the flowchart shown in FIG. 18A. A parsing module 202 parses the associated information (e.g., footnotes, headnotes, etc) from a document (Step S2). Converting module 204 converts the parsed data into a text file (Step S4) and metadata module 206 adds metadata uniquely identifying the text in the text file (Step S6) The information is then sent to a categorization module 208 (Step S8). Categorization module 208 breaks down the text file into sentences (Step S10) and categorizes each sentence (Step S12). For example, categorization module 208 runs each sentence against each category in the list (see FIG. 16) and determines association strength of each sentence to each category. Categorization module 208 then outputs each sentence, its matching categories and association strengths along with the metadata, to threshold filter module 210 (Step S14). Threshold filter module 210 then performs threshold analysis to determine which category or categories to associate with each sentence (Step S16). Threshold filter module 210 eliminates the sentences that do not match a category and eliminates matches for which the association strength is below a set value. System 200 then outputs each sentence with matching categories (Step S18). Each matching sentence is linked back to its location in the document via document offset numbers. The offsets, referred to above as "document identifier" are what allows the best-matching sentence to be viewed in its context in addition to being viewed independently.

There are various types of processing systems that can be used to categorize data. An example of a categorization module 208 is made by Alias-I, Inc. The module processes sentences and performs statistical matches against selected elements. For example, according to an embodiment of the present disclosure, the module rates each sentence from the associated notes against each category and outputs the results.

Figure 18B:
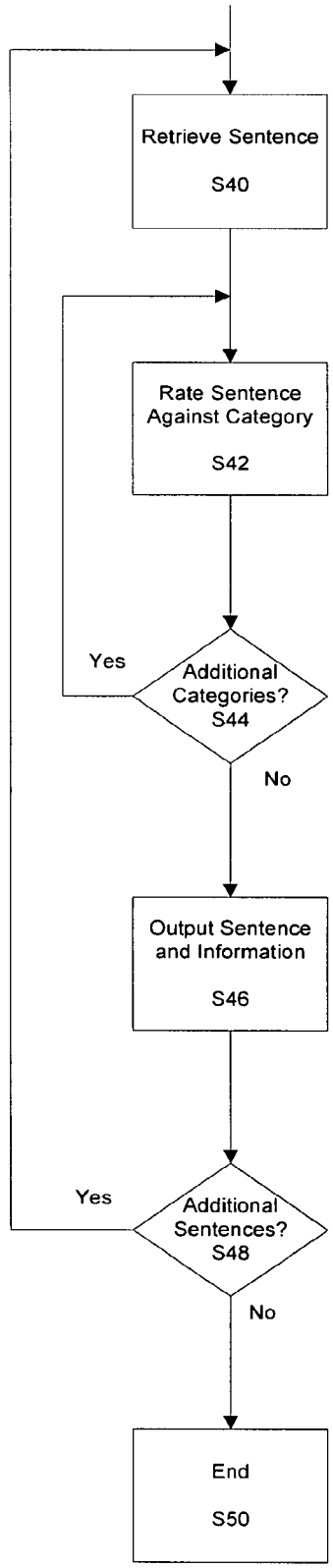

An example of operation of the categorization module (Step S12) will be explained by reference to FIG. 18B. The first sentence from the associated notes is retrieved (Step S40) and rated against a first category (e.g., Cash and Cash Equivalents). The result (associated match strength) is saved. If additional categories exist (Yes, Step S44), the process returns to Step S42 and rates the sentence against the next category. This process repeats until no additional categories exist (No, Step S44). The module then outputs the sentence and the associated category matches as well as the match strengths (Step S46), If additional sentences exist (Yes, Step S48), the process returns to Step S40 and process repeats. If no additional sentences exist, the process ends (Step S50).

According to an embodiment of the present disclosure, the categorization module outputs the input string and its associated match strength represented as a number between zero and one. The module outputs the input string and its associated match strength represented as a number between zero and one. An associated match strength closer to one indicates a stronger match. That is, the closer the associated match strength is to one, the more likely it is that the sentence corresponds to the category. An associated match strength closer to zero indicates a weaker match. That is, the closer the associated match strength is to zero, the less likely it is that the sentence corresponds to the category.

Figure 19:
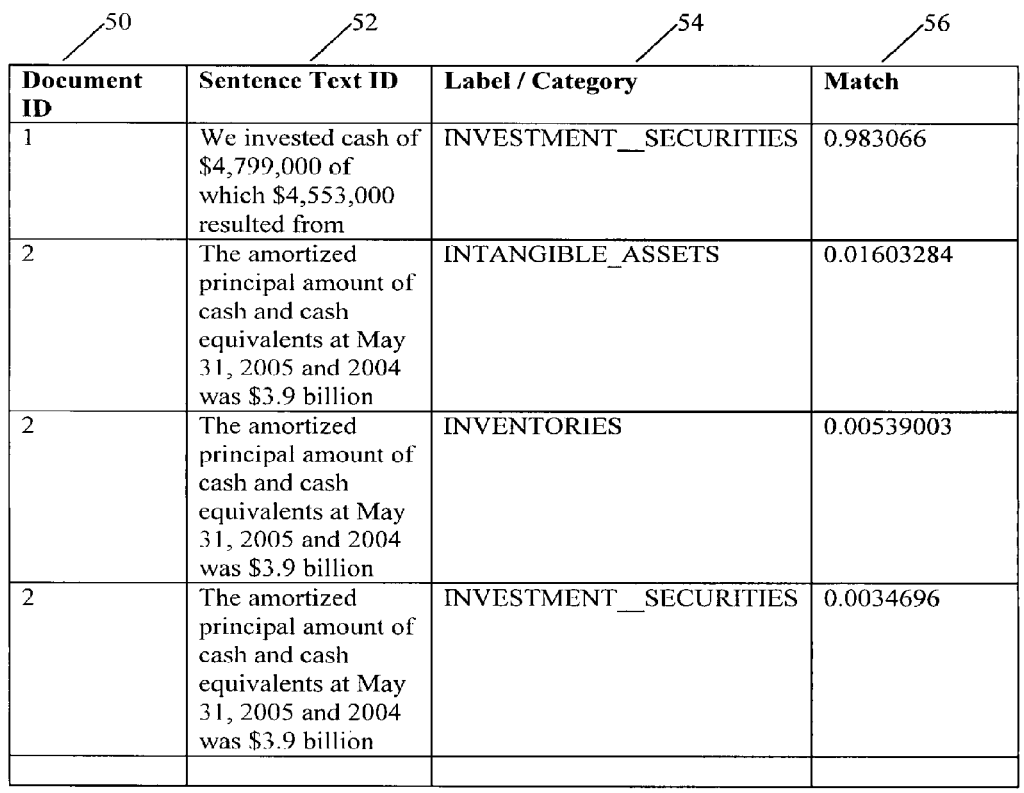
FIG. 19 is a table of sentences with category labels and association strengths for describing aspects of embodiments of the present disclosure.

An example of some of the information output by categorization module 208 is shown in FIG. 19, Categorization module 208 outputs a Document ID 50 which identifies the sentence. The Sentence Text ID 52 shows at least a portion of the text of the sentence. Label/Category 54 shows the category or categories which the categorization module has associated with the sentence. Association Match Strength 56 shows the relative strength of the match. In the example shown in FIG. 19, the first sentence (Document ID 1) matches the "Investment Securities" category with an association strength of 0.983066 (approximately 98%). There are no other matches for this sentence. For the second sentence (Document ID 2), there are three matches. The matches are "Intangible Assets" (0.01603284 or approx. 1.6% association strength), "Inventories" (0.00539003 or approx 0.5% association strength) and "Investment Securities" (0.0034696 or approx. 0.34% association strength), respectively. Accordingly, for the second sentence, the best match is the category "Intangible Assets" although the association strength is weak.

According to an embodiment of the present disclosure, the categorization module 208 is trained prior to being used. For example, according to an embodiment of the present disclosure, prior to the categorization modules initial use, each sentence in a training corpus is run blind against each category from a list, and category matches are determined. Precision and recall measures are taken based on the "ground truth" of the category. For example, since training data is being run against training data, we know what the actual categories should be. That is, for each sentence in a category "A", there are exactly that many in the "test set". Accordingly, if every "A" is correctly called "A", there is 100% precision and recall (on that category). If the categorization module 208 does not find all the "A"s (e.g., it .finds some "B"s or "C"s) the categorization module 208 has a recall problem. Recall is the ratio of the number of relevant records retrieved to the total number of relevant records in the database and is usually expressed as a percentage. If the categorization module 208 finds too many "A"s, it has a precision problem. Precision is the ratio of the number of relevant records retrieved to the total number of irrelevant and relevant records retrieved and is also usually expressed as a percentage. If a recall and/or precision problem exists, parameters of the categorization module 208 can be modified until the results output by the categorization module are acceptable.

Running such test runs on training data is known as a "cheating" experiment and although these test runs are an indication of whether the system is working properly and is generally considered a reliable way to judge training data quality, it will be appreciated that results may vary greatly on subsequent test sets of real-world data. Data in the training corpus that is not run during these testing rounds (also referred to as "held out" data) is run when the previous testing rounds are yielding good results. For example, results are considered good when relevant sentence matches to categories are consistently above the level of matches of non-relevant sentences. Various types of categorization techniques can be utilized by categorization module 208 for the matching process. For example, according to an embodiment of the present disclosure, the matching process is a character-based Bayesian statistical model. Of course, other categorization techniques can be utilized as desired.

Threshold filter module 210 filters the data so that only the match or matches having sufficient association strength are presented to the user. Various types of filtering strategies can be used to determine which match to present to the user if there are multiple matches. For example, the filtering strategy could be "best match" in which case only the match with the highest association strength would be displayed. in the alternative, a filtering strategy could be "matches over n %" in which only matches with association strengths above a predefined value (n) are displayed. A filtering strategy could even be used in which "all matches found" can be displayed. According to an embodiment of the present disclosure, when multiple matches for a single sentence are displayed, they are shown in rank order from highest association strength to lowest association strength. According to an embodiment of the present disclosure, the user is given an option to select which filtering strategy to use, and to define the predefined value (n) as they desire.

Figure 21:
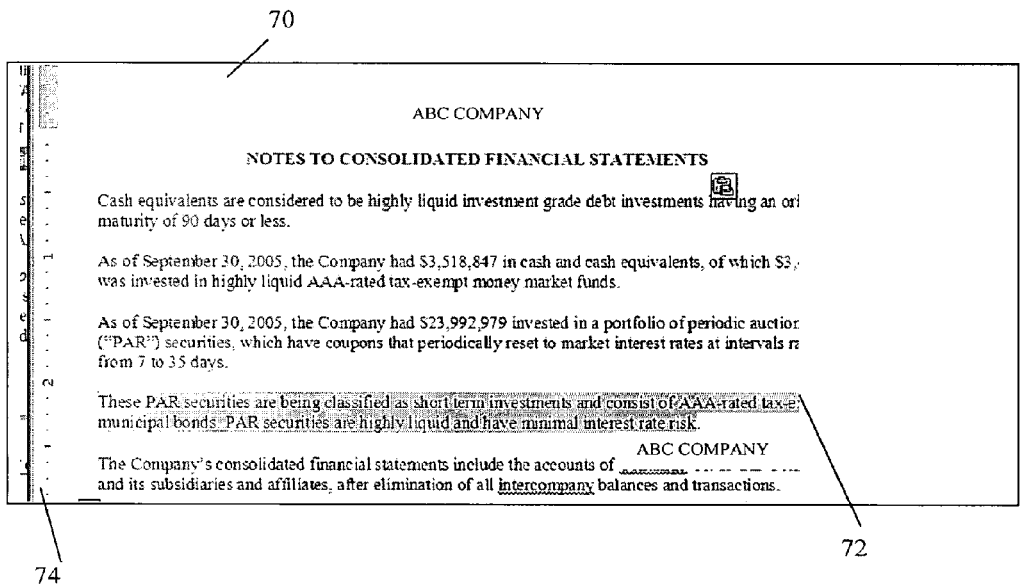
FIG. 21 is a screen shot of associated footnote information displayed to a user according to an embodiment of the present disclosure.

FIG. 20 is an example of a spread sheet populated with data showing a portion of information from a financial document of ABC Company. This information represents the financial data from the "main" portion of the financial document including XBRL data 60. According to an embodiment of the present disclosure, "Short Term Investments," 62 is circled or otherwise highlighted to indicate that there is associated information corresponding to this category. When a user then double clicks on "Short Term Investments", a page 70 as shown in FIG. 21 will pop up showing all of the associated information for this financial document. In this example, the associated information is "Notes to Consolidated Financial Statements." According to this embodiment, each sentence from the notes is displayed with the particular sentence (72) associated with the "Short Term Investments" being highlighted. This allows the user to view the notes in context with the financial data from the main portion of the financials. In addition, since each sentence in the Notes is listed in the same order they are shown in the actual financial document, the user can view the associated information in context with the other associated information. According to another embodiment of the present disclosure, only the associated sentences for that category would be displayed in pop up page 70. Moving scroll bar 74 down the page, the user can review all of the Notes from that financial statement if desired.

Figure 22:
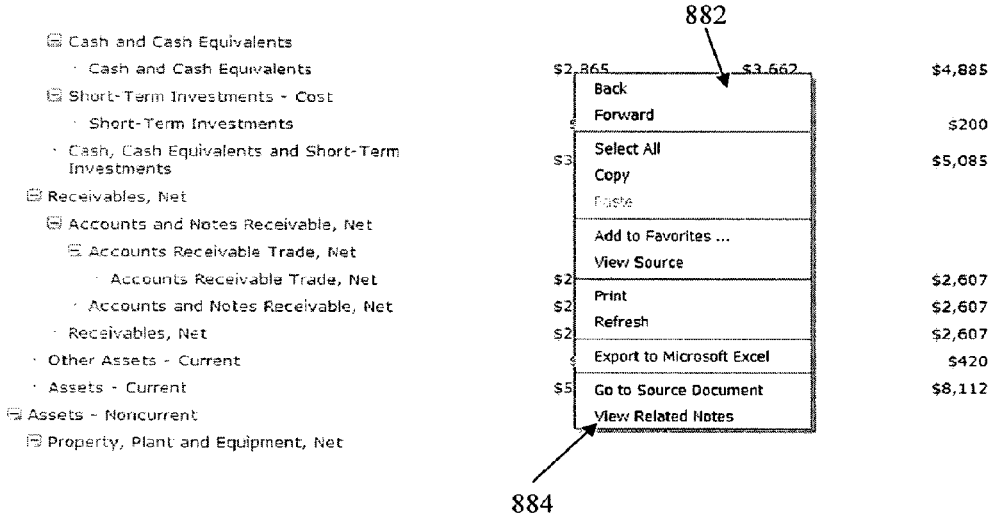
FIG. 22 is a screen shot showing a drop down menu according to an embodiment of the present disclosure.
Figure 23:
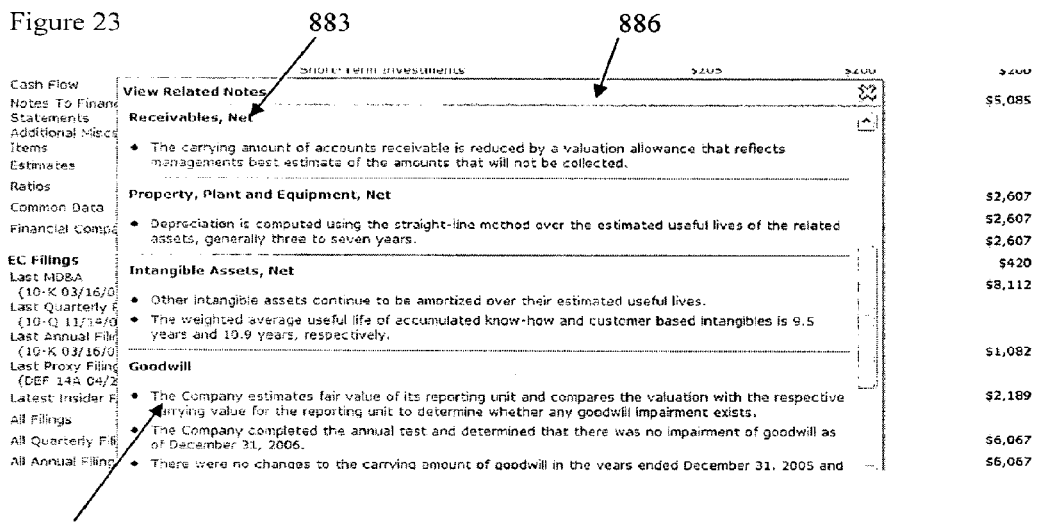
FIG. 23 is a screen shot of extracted related notes according to an embodiment of the present disclosure.

There are various ways the associated information can be accessed. According to an embodiment of the present disclosure, the user can access associated. information using a drop-down menu. For example, a user can right click on an area of interest in the document (e.g., in a table or in the text) and choose to view information associated with the information in the area of interest. As shown in FIG. 22, when a user right clicks on an area of interest (e.g., the value $2,865) in the displayed data, the user is presented with a drop-down menu 882 giving the user the option to review the associated information relating to that area of interest by clicking View Related Notes 884. As shown in FIG. 23, after clicking View Related Notes 884, the user is presented with a related notes window 886 showing the information extracted for each category with the category for the chosen information 883 displayed on top.

The user can then click on a sentence to view the information in context. For example, by clicking on sentence 885, the user is presented with a display such as that shown in FIG. 24 with the sentence highlighted and shown in its proper context.

According to other embodiments of the present disclosure, the user can access the associated information by clicking a link to the footnotes information, for example, found in a task-bar, a header or right-hand menu column near die area of interest.

For ease of description, various embodiments of the present disclosure have been described above as using individual "modules" for implementing various features. However, it will be appreciated that two or more (e.g., all) of these. modules may be combined into one (or more) module(s) for executing code for rendering components of the present disclosure.

The present system can be implemented in digital electronic circuitry, or in computer hardware, firmware, software, or in combinations of them. The system can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers al one site or distributed across multiple sites and interconnected by a communication network.

Method steps associated with the present system can be performed by one or more programmable processors executing a computer program to perform functions of the invention by operating on input data and generating output. Method steps can also be performed by, and apparatus of the disclosure can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and dim include all forms of non-volatile memory, including by way of example, semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; CD-ROMs (Compact Disc Read-only Memory) and DVD-ROMs (Digital Versatile Disc Read-only Memory). The processor and the memory can be supplemented by, or incorporated in special purpose logic circuitry.

To provide for interaction with a user, the present disclosure can he implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The present system can be implemented in a computing system that includes a back end component, e.g., as a data server, or that includes a middle-ware component, e.g., an application server, or that includes a front-end component, e.g., a client computer having a graphical interface or a Web browser through which a user can interact with an implementation of the present disclosure, or any combination of such back-end, middleware, or front-end components. The components of the computing system can be interconnected by any form or medium of digital data communication, e.g., a communication network. Examples of communication networks include a local area network "LAN") and a wide area network ("WAN"), e.g., the Internet.

The computing system can include clients and servers. A client and server are generally remote from each other and typically interact through a communication network.

The relationship of client and server arises by virtue of computer programs running on respective computers and having a client-server relationship to each other.

The present system has been described in terms of particular embodiments. Other embodiments are within the scope of the following claims. For example, although the present system has been described as a component in a larger system, it can also be implemented in other systems or as a stand-alone system.

Numerous additional modifications and variations of the present disclosure are possible in view of the above-teachings. It is therefore to be understood that within the scope of the appended claims, the present disclosure may be practiced other than as specifically described herein. For example, elements and/or features of different illustrative embodiments may be combined with each other and/or substituted for each other within the scope of this disclosure and appended claims.

What is claimed is:

1. A method of viewing information associated with business and/or financial data, comprising:
   parsing a document to retrieve information associated with business and/or financial data, the document including the business and/or financial data and the associated information;
   processing the associated information to identify at least one sentence included in the associated information; and
   for each sentence of the at least one sentence identified in the processing, identifying a topic of the sentence, wherein identifying a topic of the sentence comprises:
      comparing the sentence to at least one category in a taxonomy corresponding to the business and/or financial data to determine whether the topic of the sentence corresponds to the at least one category of the taxonomy corresponding to the business and/or financial data, each category of the at least one category in the taxonomy corresponding to a meaning of a type of business data or a type of financial data;
      assigning, based at least in part on the comparing, at least one association strength to the sentence, each of the at least one association strength indicating a likelihood that the topic of the sentence actually corresponds to one of the at least one category in the taxonomy;
      filtering the at least one association strength to determine one or more categories of the at least one category in the taxonomy with which to match the sentence; and
      outputting the sentence matched, based at least in part on the filtering, with the one or more categories of the at least one category in the taxonomy;
   wherein:
      the business and/or financial data of the document comprises a plurality of items of business and/or financial content, each item of the plurality of items being categorized according to at least one second category of a second set of categories;
      a sentence of the at least one sentence relates to at least one item of the plurality of items;
      outputting the sentence matched with the one or more categories comprises outputting the sentence matched with a first category of the at least one category of the taxonomy;
      one or more categories of the at least one category in the taxonomy correspond to one or more second categories of the second set of categories; and
   the method further comprises:
      evaluating the first category of the taxonomy with which the sentence is matched to determine an item of the plurality of items to which the sentence is related,
      associating the item of the plurality of items with at least one portion of a structured document, and
      associating the sentence with the at least one portion of the structured document.

2. The method of claim 1, wherein:
   the document is a financial statement of an enterprise and the business and/or financial data relates to the enterprise; and
   the associated information of the document comprises footnotes, head notes and/or management discussion that is associated with the business and/or financial data included in the document.

3. The method of claim 1, further comprising converting the retrieved associated information into a text file prior to processing the associated information.

4. The method of claim 1, wherein the filtering comprises applying a "best match" type filter in which only a match with a highest association strength is output from the filtering.

5. The method of claim 1, wherein the filtering comprises applying a "matches over n" type filter in which only matches with association strengths above a predefined value (n) are output from the filtering.

6. The method of claim 5, wherein the filtering comprises outputting from the filtering the matches with association strengths above a predefined value (n) in order from highest association strength to lowest association strength.

7. The method of claim 1, wherein:
   the at least one category in the taxonomy comprises a plurality of categories in the taxonomy;
   assigning the at least one association strength to the sentence comprises assigning a plurality of association strengths to the sentence, each association strength of the plurality of association strengths corresponding to a category in the taxonomy and indicating a likelihood that a topic of the sentence corresponds to the category;
   filtering the at least one association strength to determine one or more categories of the at least one category with which to match the sentence comprises filtering based at least in part on the plurality of association strengths to determine a category of the plurality of categories with which to match the sentence; and
   outputting the sentence matched with one or more categories of the at least one category comprises outputting the sentence matched with the category.

8. The method of claim 1, wherein:
   the plurality of items of business and/or financial content are arranged in a tabular format in the document; and
   the method further comprises categorizing the plurality of items arranged in the tabular format according to the second set of categories.

9. The method of claim 1, wherein:
   associating the item with the at least one portion of the structured document comprises storing the item as content of a cell of a spreadsheet; and
   associating the sentence with the at least one portion of the structured document comprises associating the sentence with the at least one sentence such that, in response to receiving input from a user that requests output of the associated information and that identifies the at least one portion of the structured document, at least the sentence is output.

10. The method of claim 1, further comprising:
displaying the structured document, wherein displaying the structured document comprises displaying the item;
receiving input from the user requesting display of the associated information and identifying the item and/or the at least one portion with which the item is associated; and
in response to receiving the input, displaying the sentence.

11. The method of claim 1, further comprising, for the sentence of the at least one sentence:
identifying an item, of the plurality of items, to which the sentence is related; and
in response to receiving a request to output information that is related to the item, outputting the sentence.

12. The method of claim 1, wherein comparing the sentence to the at least one category in the taxonomy comprises comparing the sentence to the at least one category in a taxonomy in which each category in the taxonomy corresponds to sentences that express a meaning of a type of business data or a type of financial data.

13. The method of claim 1, further comprising:
displaying the at least one sentence categorized according to the at least one category at least in part by displaying a first group of one or more sentences categorized according to a first category of the at least one category and displaying a second group of one or more sentences categorized according to the second category of the at least one category, the first category corresponding to a first meaning of a type of business data or a type of financial data and the second category corresponding to a second meaning of a type of business data or a type of financial data;
wherein displaying the first group comprises displaying a first title identifying the first meaning and displaying the one or more sentences of the first group; and
wherein displaying the second group comprises displaying a second title identifying the second meaning and displaying the one or more sentences of the second group.

14. At least one hardware machine-readable storage encoded with executable instructions that, when executed by at least one computer, cause the at least one computer to carry out a method for viewing information associated with business and/or financial data, the method comprising:
parsing a document to retrieve information that is related to an enterprise and associated with business and/or financial data for the enterprise, the document including the business and/or financial data for the enterprise and the associated information relating to the enterprise;
processing the associated information to identify at least one sentence included in the associated information, wherein the document comprises business and/or financial data related to the enterprise and comprising a plurality of items of business and/or financial content and a sentence of the at least one sentence identified in the processing relates to at least one item of the plurality of items;
categorizing the at least one sentence to determine a meaning of each of the at least one sentence, wherein categorizing a sentence of the at least one sentence comprises determining whether a meaning of the sentence corresponds to at least one first category in a taxonomy corresponding to the business and/or financial data, each first category of the at least one first category in the taxonomy corresponding to sentences that express a meaning of a type of business data or a type of financial data, each item of the plurality of items being categorized according to at least one second category of a second set of categories, one or more of the first categories of the at least one first category in the taxonomy corresponding to one or more second categories of the second set of categories;
assigning at least one association strength to each of the categorized at least one sentence, each association strength indicating a likelihood that a meaning of a sentence of the categorized at least one sentence actually corresponds to a first category of the at least one first category in the taxonomy;
filtering each of the at least one categorized sentence based on the at least one association strength to determine whether to match each of the categorized at least one sentence with the at least one first category in the taxonomy;
outputting each of the categorized at least one sentence matched, based at least in part on the filtering, with a first category of the at least one first category in the taxonomy;
evaluating the first category with which a first sentence of the at least one sentence is matched to determine a first item of the plurality of items to which the first sentence is related;
associating a first item of the plurality of items with at least one portion of a structured document; and
associating the first sentence related to the first item with the at least one portion of the structured document.

15. The at least one hardware machine-readable storage of claim 14, wherein the method further comprises converting the retrieved associated information into a text file prior to processing the associated information.

16. The at least one hardware machine-readable storage of claim 14, wherein the filtering comprises applying a "best match" type filter in which only a match with a highest association strength is output from the filtering.

17. The at least one hardware machine-readable storage of claim 14, wherein the plurality of items of business and/or financial content are arranged in a tabular format in the document.

18. A system comprising:
at least one processor; and
at least one hardware machine-readable storage encoded with executable instructions that, when executed by the at least one processor, cause the at least one processor to carry out a method for viewing information associated with business and/or financial data, the method comprising:
parsing a document to retrieve information associated with business and/or financial data, the document including the business and/or financial data and the associated information, the business and/or financial data comprising a plurality of items of business and/or financial content;
processing the associated information to identify a sentence included in the associated information, wherein a sentence of the at least one sentence identified in the processing relates to at least one item of the plurality of items;
evaluating a combination of words included in the sentence to determine whether a meaning expressed by the combination of words included in the sentence corresponds to at least one first category in a taxonomy corresponding to the business and/or financial data, each first category of the at least one first category in the taxonomy corresponding to sentences that express a meaning of a type of business data or a type of financial data, each item of the plurality of items being categorized according to at least one second category of a second set of categories, one or more first categories of the at least one first category in the taxonomy corresponds to one or more second categories of the second set of categories;

assigning at least one association strength to the sentence, each association strength of the at least one association strength indicating a likelihood that the meaning expressed by the combination of words included in the sentence actually corresponds to a first category of the at least one first category in the taxonomy;

filtering the at least one association strength to determine whether to match the sentence with one or more categories of the at least one category in the taxonomy;

outputting the sentence matched, based at least in part on the filtering, with a first category of the at least one first category in the taxonomy;

evaluating the first category with which the sentence is matched to determine an item of the plurality of items to which the sentence is related;

associating the item of the plurality of items in at least one portion of a structured document; and associating the sentence with the at least one portion of the structured document.

19. The system of claim 18, wherein the filtering comprises applying a "matches over n %" type filter in which only matches with association strengths above a predefined value (n) are output from the filtering.

20. The system of claim 18, wherein the plurality of items of business and/or financial content are arranged in a tabular format in the document.

* * * * *